US012543192B2

(12) United States Patent
Awadin et al.

(10) Patent No.: US 12,543,192 B2

(45) Date of Patent: Feb. 3, 2026

(54) PDCCH ENHANCEMENTS FOR REDUCED CAPABILITY NEW RADIO DEVICES

(71) Applicant: IPLA HOLDINGS INC., New York, NY (US)

(72) Inventors: Mohamed Awadin, Wilmington, DE (US); Yifan Li, Wilmington, DE (US); Patrick Svedman, Wilmington, DE (US); Kyle Pan, Wilmington, DE (US); Allan Tsai, Wilmington, DE (US); Pascal Adjakple, Wilmington, DE (US); Jerome Vogedes, Wilmington, DE (US); Guodong Zhang, Wilmington, DE (US)

(73) Assignee: IPLA HOLDINGS INC., New York, NY (US)

( * ) Notice: Subject to any disclaimer, the term of this patent is extended or adjusted under 35 U.S.C. 154(b) by 304 days.

(21) Appl. No.: 18/035,532

(22) PCT Filed: Nov. 18, 2021

(86) PCT No.: PCT/US2021/059908

§ 371 (c)(1),
(2) Date: May 5, 2023

(87) PCT Pub. No.: WO2022/109146

PCT Pub. Date: May 27, 2022

(65) Prior Publication Data

US 2024/0015760 A1 Jan. 11, 2024

Related U.S. Application Data

(60) Provisional application No. 63/116,275, filed on Nov. 20, 2020.

(51) Int. Cl.
*H04W 72/232* (2023.01)
*H04W 72/11* (2023.01)

(52) U.S. Cl.
CPC .......... *H04W 72/232* (2023.01); *H04W 72/11* (2023.01)

(58) Field of Classification Search
CPC ............................ H04W 72/232; H04W 72/11
(Continued)

(56) References Cited

U.S. PATENT DOCUMENTS

2018/0026803 A1 1/2018 Fujishiro et al.
2018/0295651 A1 10/2018 Cao et al.
(Continued)

FOREIGN PATENT DOCUMENTS

EP 3478019 A1 5/2019

OTHER PUBLICATIONS

International Search Report and Written Opinion mailed on Mar. 3, 2022, received for PCT Application PCT/US2021/059908, filed on Nov. 18, 2021, 12 pages.
(Continued)

*Primary Examiner* — Christopher M Crutchfield
*Assistant Examiner* — Jean F Voltaire
(74) *Attorney, Agent, or Firm* — XSENSUS LLP

(57) ABSTRACT

Configured uplink and/or downlink grants may be managed by providing configuration parameters through higher layer signaling and then activating and/or deactivating use of provided configurations through group common PDCCH signalling that is transmitted to multiple UEs simultaneously. Similarly, enhancements to group common PDCCH signalling may be used to achieve dynamic scheduling.

16 Claims, 23 Drawing Sheets

(58) Field of Classification Search
USPC .......................................................... 370/329
See application file for complete search history.

(56) References Cited

U.S. PATENT DOCUMENTS

2019/0132824 A1* 5/2019 Jeon ...................... H04L 5/0098
2020/0403766 A1* 12/2020 Xiang ............... H04W 72/0453
2021/0345343 A1* 11/2021 Taherzadeh Boroujeni ................ H04W 72/54

OTHER PUBLICATIONS

NTT Docomo et al., "Offline discussions for enhanced configured grant PUSCH transmissions", 3GPP TSG RAN WG1 Meeting #96, R1-1903707, Feb. 25-Mar. 1, 2019, pp. 1-82.

* cited by examiner

The subcarriers indices of the REs carrying the piggybacked DCI are shifted from the subcarriers indices of REs carrying DMRS

PDCCH ENHANCEMENTS FOR REDUCED CAPABILITY NEW RADIO DEVICES

CROSS-REFERENCE TO RELATED APPLICATIONS

This application is based on PCT filing PCT/US2021/059908, filed on Nov. 18, 2021, which claims the benefit of U.S. Provisional Patent Application No. 63/116,275, filed on Nov. 20, 2020, titled "PDCCH enhancements for reduced capability new radio devices," the content of each of which is hereby incorporated by reference herein.

BACKGROUND

This disclosure pertains to the operation of wireless of networks such as those described in 3GPP TS 38.214, Physical layer procedures for data (Release 16), V16.2.0 and 3GPP TS 38.213, Physical layer procedures for control (Release 16), V16.2.0, for example.

SUMMARY

Configured uplink and/or downlink grants may be managed by providing configuration parameters through higher layer signaling and then activating and/or deactivating use of provided configurations through group common PDCCH signalling that is transmitted to multiple UEs simultaneously. Similarly, enhancements to group common PDCCH signalling may be used to achieve dynamic scheduling.

DCI may be multiplexed (piggybacked) on anchor PDSCH by, for example informing the UE about which PDSCH can be considered as an anchor PDSCH and expected to carry piggybacked DCI. The UE can inherit some configurations of the anchor PDSCH to reduce the size of piggybacked DCI.

Triggering of aperiodic CSI reports for a group of UEs may be enabled, for example, via a CSI request field in GC-PDCCH to trigger aperiodic CSI and provide the PUSCH grant to different UEs to transmit their report.

Deactivation and/or activation of semi-persistent CSI reports for a group of UEs may also be enabled via a CSI request field in GC-PDCCH. Control fields of GC-PDCCH may be used to indicate whether GC-PDCCH is used for activation or deactivation of semi-persistent CSI report.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

Figure 1:
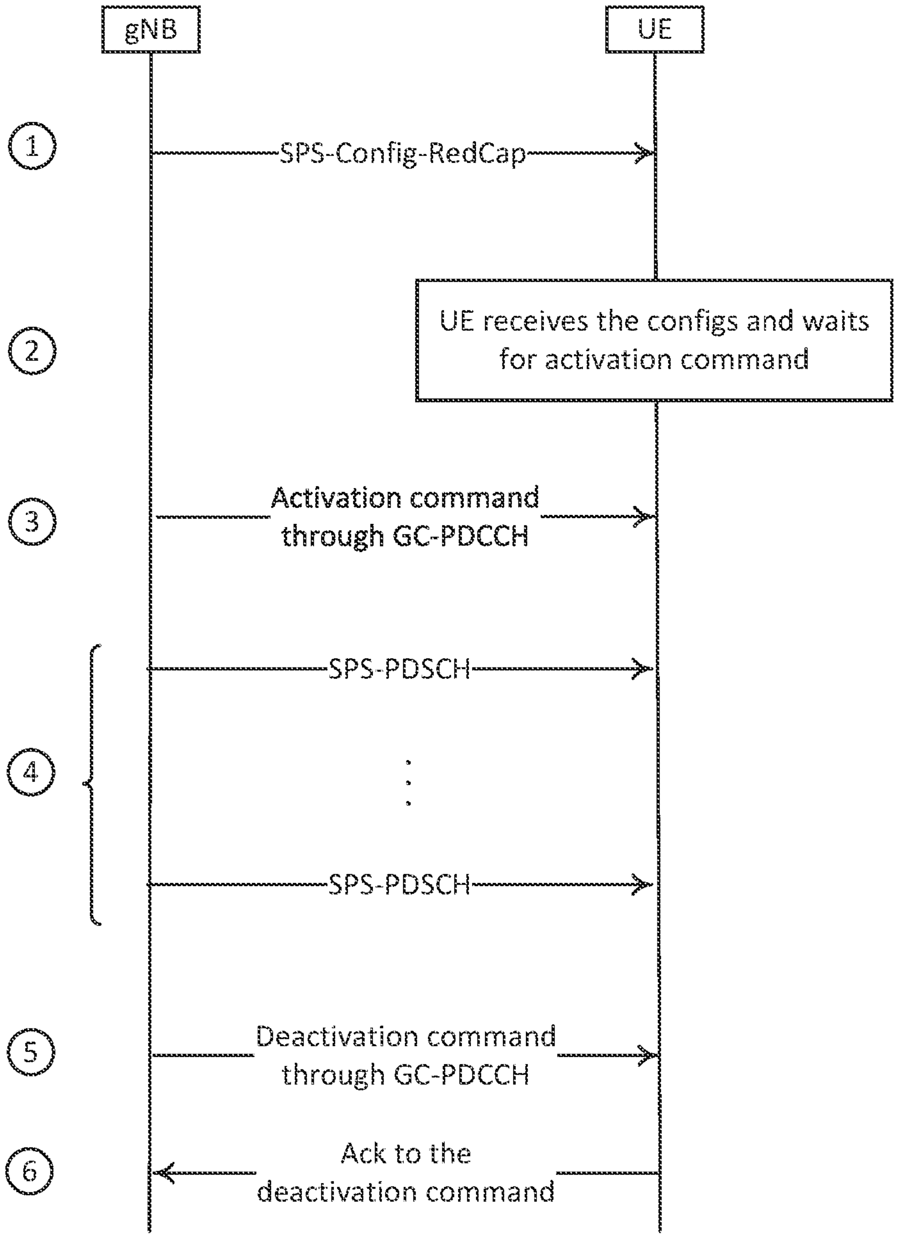
FIG. 1 is a call flow of an example of deactivation and/or activation of SPS-DL Type 2.

Table 15 of the Appendix describes many of the acronyms used herein.

Configured Grant in NR

In NR Rel. 15/16, configured uplink (UL) grant type 2 and semi-persistent scheduling (SPS) downlink (DL) can be deactivated and/or activated by use equipment (UE)-specific PDCCH which is validated as follows. The cyclic redundancy check (CRC) of a corresponding DL control information (DCI) format is scrambled with a CS-RNTI provided by cs-RNTI, and the NDI field in the DCI format for the enabled transport block is set to '0'. The DFI flag field, if present, in the DCI format is set to '0'. If validation is for scheduling activation and if the physical downlink shared channel (PDSCH)-to-hybrid automatic repeat request (HARQ) feedback timing indicator field in the DCI format is present, the PDSCH-to-HARQ feedback timing indicator field does not provide an inapplicable value from dl-DataToUL-ACK.

See 3GPP TS 38.213, Physical layer procedures for control (Release 16), V16.2.0.

If the UE is provided with a single UL configured grant (CG) type 2 or DL SPS, then activation DCI is shown in Table 1 of the Appendix.

If the UE is provided with a single UL CG type 2 or DL SPS, then deactivation DCI is shown in Table 2 of the Appendix.

If the UE is provided with multiple UL CG type 2 or DL SPS, then the value of HARQ field indicates index of activated grant provided by Configuredgrantconfig-index or by SPSconfig-index. In this case, the activation DCI is shown in Table 3 of the Appendix.

If the UE is provided with multiple configurations for UL CG Type 2 or DL SPS, and the UE is provided by Type2Configuredgrantconfig-ReleaseStateList or SPS-ReleaseStateList, a value of the HARQ field indicates a corresponding entry for scheduling release of one or more UL grant Type 2 PUSCH or SPS PDSCH configurations. If the radio resource control (RRC) lists are not provided, then the value HARQ field indicates the index of the released grant. In this case, the deactivation DCI is shown in Table 4 of the Appendix.

Example Challenges

It is expected that many reduced capability NR devices may need to cooperate to accomplish certain task. For example, several cameras may need to upload the live captured videos to cooperatively provide the controller with an idea about the monitored area, traffic, etc. In this example, the controller transmits simultaneous triggers/activations which enables the cameras to upload/transmit such videos to the controller. Another use case is that several actuators may need to receive different messages simultaneously and synchronously to cooperatively accomplish one task, e.g., printing machine, rotating pars of machines, etc. In this use case, the controller simultaneously transmits such messages to the actuators. Therefore, relying on UE-specific signaling to deactivate and/or activate or trigger or schedule any DL or UL transmission would consume more resources due to signaling overhead, especially in the case of large number of devices and/or UEs. This could result in decreased spectral efficiency of system. For example, using UE-specific physical downlink control channel (PDCCH) to deactivate and/or activate uplink (UL) configured grant Type 2 or Semi-Persistent Scheduling downlink (SPS-DL) of individual UEs results in a waste of resources, if we know a-priori that those UEs need to receive the deactivation and/or activation commands at the same time. Similarly, triggering aperiodic or deactivating and/or activating semi-persistent channel state information (CSI) reporting through UE-specific PDCCH would consume many of the available control channel elements (CCEs) if such process is done for many UEs. Therefore, we need to develop solutions to overcome such issues when dealing with many UEs.

Example Approaches

Although the solutions described herein target reduced capability NR devices, these solutions may be used with other devices such as legacy UEs, regular UEs, and non-reduced capability NR devices as well, for example.

Throughout this disclosure, the term "UE-specific PDCCH" refers to the PDCCH that is transmitted in a UE-specific search space and the term "group-common PDCCH" refers to the PDCCH that is transmitted in a common search space. Please note that "UE-specific" and "UE-dedicated" are used interchangeably throughout the disclosure.

While enhancements for GC-PDCCH may be used to provide dynamic grants or deactivate and/or to activate semi-persistent scheduling, it will be appreciated that solutions may be created using Medium Access Control-Control Element (MAC-CE) technology. For example, GC-PDCCH/UE-specific PDCCH may schedule MAC-CE to realize the same functionalities of the GC-PDCCH described herein. The fields of MAC-CE may be similar to the designed control fields of GC-PDCCH.

New Type of Configured Scheduling

To cope with the overhead associated with using UE-specific PDCCH to deactivate and/or activate UL configured grant Type 2 or SPS DL, we introduce new types of configured scheduling for both DL and UL that may be deactivated and/or activated for a group of UE simultaneously. Herein we may refer to downlink configured scheduling as as SPS-DL Type 2 and uplink configured scheduling as UL CG Type 3.

As a potential enhancement, the gNB may configure reduced capability new radio (NR) devices with all the parameters applied for the DL or UL transmission through higher layer signaling, e.g. RRC information element (IE) SPS-Config-RedCap and ConfiguredGrantConfig-RedCap, respectively, that can be either UE-specific RRC configurations transmitted through UE-specific signaling or group-common RRC configurations transmitted through broadcast/groupcast signaling, or through a combination of RRC+MAC-CE. For group common RRC configuration, the same RRC configuration could be transmitted to a group of UEs and could be activated or deactivated via a group common DCI carried in group common PDCCH. Once gNB provides the UE with the configurations of the DL/UL configured scheduling, gNB may deactivate and/or activate the grant through group-common PDCCH. gNB could configure same or common RRC configuration for a group of UEs via either individual UE-specific RRC or common signaling such as system information or the like.

FIG. 1 shows an example of the signaling flow for SPS-DL Type 2 configuration. In step 1, gNB provides all the parameters needed for the SPS-DL Type 2 reception that can be through UE-specific or group-common higher layer signaling such as RRC or RRC+MAC-CE. Such higher layer signaling may provide the configurations of single or multiple SPS-DL Type 2 grants where one is associated with a particular index. In step 2, the UE waits for receiving the activation through GC-PDCCH which activates a set or a subset of the configured SPS-DL Type 2 in step 3. The GC-PDCCH throughout this disclosure may be a new DCI format such as 2_x, e.g., x=7, or one of the existing DCI formats where the reserved bits or repurposed fields may carry such control fields. Also, it may be used as an early wake-up signal for reduced capability NR devices. Then, the UE receives the SPS-DL based on the provided parameters in the activated SPS-DL grant as shown in step 4. The UE stops monitoring SPS-DL after the reception of deactivation command in GC-PDCCH as depicted in step 5 and transmits HARQ-ACK on SPS-DL release after N symbols from the last symbol of GC-PDCCH providing release as shown in step 6. It may happen that a sub-set of the UEs does not provide an ACK which may require the gNB to transmit the deactivation command in GC-PDCCH again. In this case, if the UE transmits ACK on particular deactivation command, it may ignore the subsequent activation commands through GC-PDCCH.

Alternatively, gNB may transmit the deactivation command through UE-specific PDCCH to the individual UEs that did not provide ACK to the deactivation command transmitted on GC-PDCCH. Those UEs are expected to transmit ACK to the deactivation command transmitted through UE-specific PDCCH.

As yet another possibility, if the UE transmits ACK to deactivation command, but it received the "N" deactivation commands through GC-PDCCH after the ACK transmission, then UE may transmit ACK again. This may be beneficial if gNB did not receive the earlier ACK transmitted by the UE. The value of N may be predefined (provided in the specs) or configured through higher layer signaling.

Figure 2:
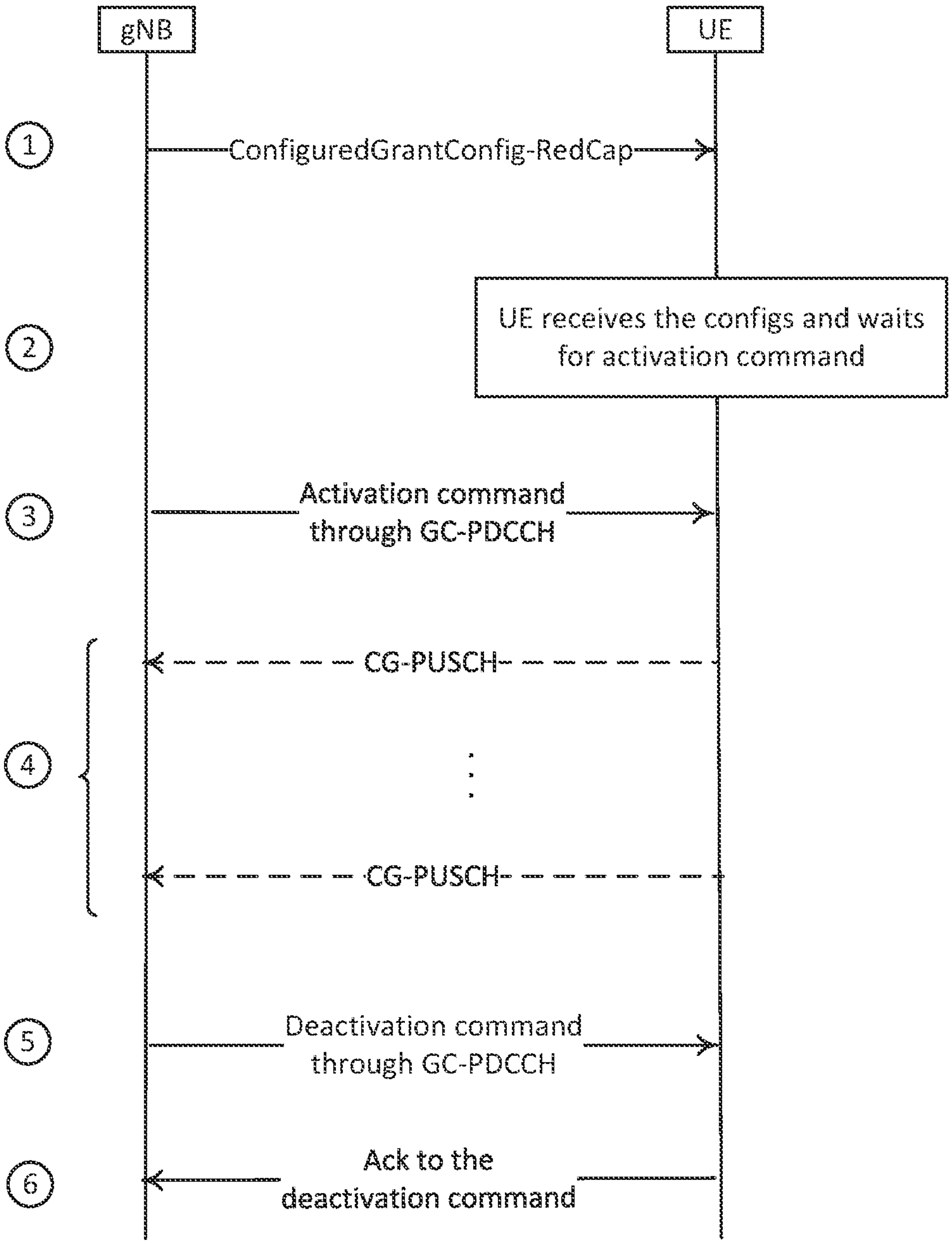
FIG. 2 is a call flow of an example of deactivation and/or activation of UL CG Type 3.

For UL CG Type 3, an exemplary signaling diagram is shown in FIG. 2. In step 1, gNB provides all the parameters needed for the UL CG Type 3 transmission that can be through UE-specific or group-common higher layer signaling such as RRC or RRC+MAC-CE. Such higher layer signaling may provide the configurations of single or multiple UL CG Type 3 configurations where one is associated with a particular index. In step 2, the UE waits for receiving the activation through GC-PDCCH which activates a set of the configured UL CG Type 3 in step 3. Then whenever needed, the UE picks one of the activated UL CG Type 3 and commences with the UL transmission in step 4 until its deactivated in step 5. The UE transmits HARQ-ACK on UL CG release after N symbols from the last symbol of GC-PDCCH providing release as shown in step 6. It may happen that a sub-set of the UEs does not provide an ACK which may require the gNB to transmit the deactivation command in GC-PDCCH again. In this case, if the UE transmits ACK on particular deactivation command, it may ignore the subsequent activation commands through GC-PDCCH.

Alternatively, gNB may transmit the deactivation command through UE-specific PDCCH to the individual UEs that did not provide ACK to the deactivation command transmitted on GC-PDCCH. Those UEs are expected to transmit ACK to the deactivation command transmitted through UE-specific PDCCH.

As yet another possibility, if the UE transmits ACK to deactivation command, but it received the "N" deactivation commands through GC-PDCCH after the ACK transmission, then UE may transmit ACK again. This may be beneficial if gNB did not receive the earlier ACK transmitted by the UE. The value of N may be predefined (provided in the specs) or configured through higher layer signaling.

Though the exemplary signaling diagrams in FIG. 1 and FIG. 2 show that gNB use GC-PDCCH to activate and deactivate are either SPS-DL Type 2 or UL CG Type 3, gNB may use UE-specific PDCCH for either activating or deactivating any of these configured grants. For example, gNB may use UE-specific PDCCH to activate a grant and then use GC-PDCCH to deactivate this grant, or vice versa.

The higher layer signaling to configure SPS-DL Type 2, e.g., SPS-Config-RedCap, may use SPS-Config for configuring the legacy DL semi-persistent transmission as a baseline with additional parameters as shown in Code Example 1 of the Appendix. The newly introduced parameters are described in Table 5 of the Appendix.

For UL CG Type 3, gNB may use higher layer signaling similar to ConfiguredGrantConfig and/or rrc-ConfiguredUplinkGrant to provide the UE with the needed configurations. However, the UE needs to distinguish between UL CG Type 1 and UL CG Type 3. To address this, the gNB may use higher layer signaling for this purpose, e.g., RRC parameter such as GrantType, as shown Code Example 2 of the Appendix. If GrantType is set to ULCGType1, the UE shall assume that gNB configures legacy UL CG Type 1, that is just configured through RRC, no activation DCI is needed. On the other hand, if GrantType is set to UL CG Type3, the UE shall assume that gNB provides all the configurations of configured grant UL through RRC, but the gNB activates it through DCI.

To deactivate and/or activate the configured grants for different UEs, e.g., DL-SPS Type 2 or UL CG Type 3, gNB may use GC-PDCCH to deactivate and/or activate them for group of UEs at the same time. This is beneficial to reduce the number of needed UE-specific PDCCH that gNB needs to transmit to deactivation and/or activation command to each UE individually. Moreover, with most of the parameters of DL-SPS Type 2 or UL CG Type 3 are configured through higher layer signaling, the size of GC-PDCCH is expected to be small.

Assuming that each UE in a particular group is configured with just single DL-SPS Type 2 and/or UL CG Type 3 and the grants of those UEs are deactivated and/or activated simultaneously, gNB may transmit GC-PDCCH scrambled with a new RNTI that can be configured by higher layer signaling, such as RRC parameter CG-RNTI-r17, to deactivate and/or activate DL-SPS Type 2 or UL CG Type 3 for this group of UEs. Table 6 of the Appendix is an example of DCI that may be used to deactivate and/or activate DL-SPS Type 2 or UL CG Type 3.

Since gNB uses this GC-PDCCH for both activation and deactivation of the DL-SPS Type2 or UL CG Type 3, "DL/UL Indicator" points whether this DCI carries command related to DL-SPS Type 2 or UL CG Type 3. For example, if "DL/UL Indicator" is set to 1, DCI carries command for DL-SPS Type 2. On the other hand, when it is set to 0, DCI carries command for UL CG Type 3. However, if gNB configures the UE with either DL CG or UL CG, but not both, the UE may ignore the value provided by "DL/UL Indicator" field. In this case, the received activation or deactivation command is applied to the configured grant which can be either DL CG or UL CG.

The "Activation Indicator" field indicates whether the configured grant is activated or not. If it is set to 1, the DL/UL configured grant is activated based on "DL/UL Indicator". However, if it is set to zero, then UE may ignore it and should not interpret as deactivation command. The deactivation carried by another field, "Deactivation Indicator" which is set one to indicate deactivation of already activated grant.

Figure 3:
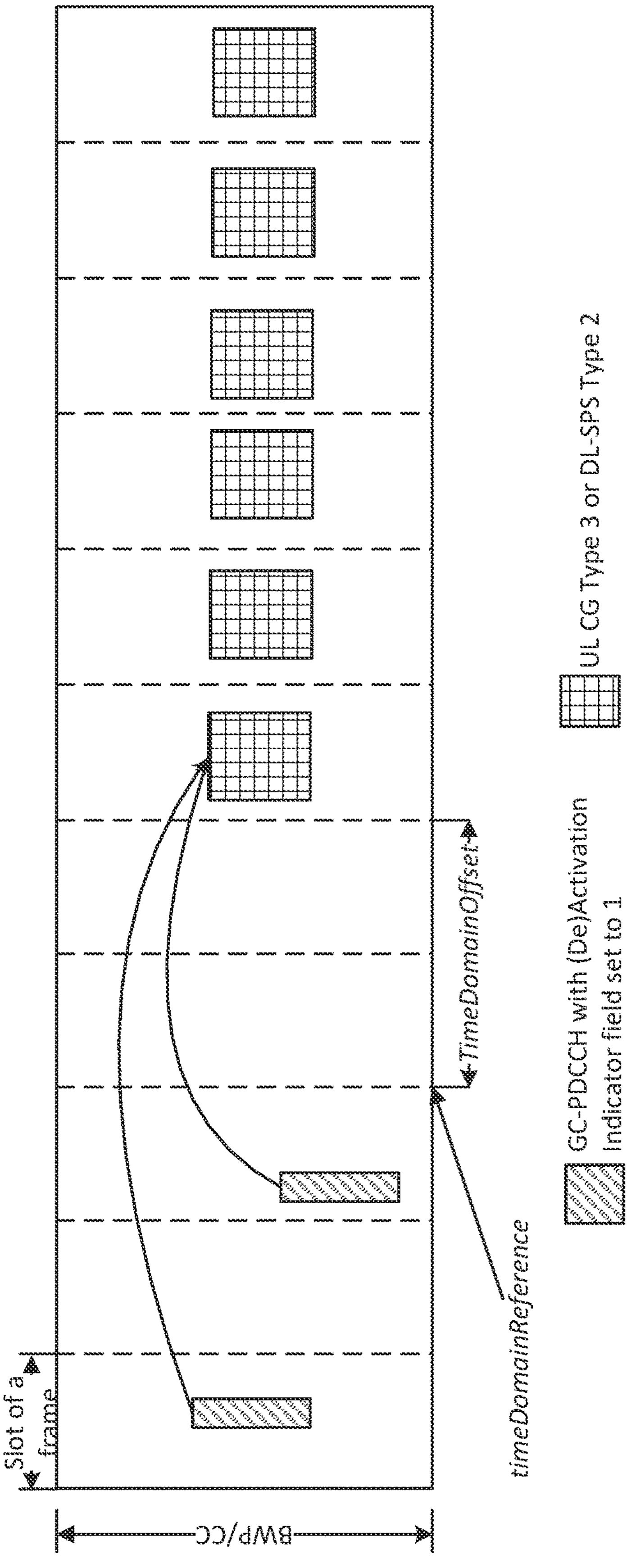
FIG. 3 is a time and frequency diagram of an example of using a GC-PDCCH to deactivate and/or activate UL CG Type 3 or DL-SPS Type 2.

The "Activation Indicator" and "Deactivation Indicator" fields are mutually exclusive fields, i.e., the UE does not expect both fields to be set to 0/1 simultaneously. However, UE may receive multiple GC-PDCCH with either "Activation Indicator" or "Deactivation Indicator" is set to 1, as shown in FIG. 3 for example. This may be beneficial if gNB attempts to enhance the coverage of GC-PDCCH through repetition for example. UE uses timeDomainOffset and/or timeDomainReference to determine the beginning of deactivated and/or activated configured DL/UL grant. Though FIG. 3 shows the configured DL/UL grant of single UE, it should be clear that GC-PDCCH may be addressed to a group of UEs. Each UE may apply the configured parameters to know deactivated and/or activated grant resources such as periodicity, time domain allocation, frequency domain allocation, etc.

Instead of having two fields for activation and deactivation of configured UL/DL grant, one field may be used for both activation and deactivation based on whether this field is toggled or not. The bit width of this field is one field. For example, if the UL CG Type 3 or DL-SPS Type 2 is active and UE receives GC-PDCCH with toggled field, then the UE may assume that UC CG Type 3 or DL-SPS Type 2 is deactivated. UE determines whether this indication is for deactivation and/or activation of DL or UL configured grant using DL/UL Indicator field. As another possibility, this one-bit field may use predefined (provided in the specs) to activate or deactivate configured UL/DL grant. For example, if the one-bit field is set to “1”, then the configured DL/UL grant is activated and if it is set to “0”, then the configured DL/UL grant is deactivated.

Instead of having a dedicated field to indicate whether deactivation and/or activation command is for DL-SPS Type 2 or UL CG Type 3, i.e., DL/UL Indicator field, other methods may be used. For example, different RNTIs may be dedicated for deactivation and/or activation of the configured DL/UL grants which may be configured by higher layer signaling such as RRC parameters de-activation-RNTI-DL and de-activation-RNTI-UL, respectively. Also, the configurations of monitoring search space sets or control resource set (CORESET) may indicate whether the transmitted GC-PDCCH is for DL or UL configured grant deactivation and/or activation. Higher layer signaling may carry this indication such as RRC parameter usage that may be set to ENUMERATED {DL-SPSType2, ULCGType3} in the configurations of either the CORESET or the search space sets.

Moreover, instead of configuring the offset of the configured UL or DL grant through higher layer signaling, the DCI in GC-PDCCH may carry the time offset as shown Table 7 of the Appendix with additional field “Time Offset Indicator” for example. This field may point to one of a plurality of offset values that may configured through higher layer signaling such as RRC or RRC+MAC-CE. Here, different UEs in the group may be configured with different offset values so that the same indicated value (codepoint) in the DCI maps to different offset values. Though the bit width of this field is fixed in Table 7, in general it may vary and depend on the number of configured time offset values, e.g., the bit width may be equal to $\log_2$(number of time offset values). The time may be from particular SFN/slot. For example, it may be applied from the SFN/slot that carries PDCCH or other SFN/slot configured by timeDomainReference.

Figure 4:
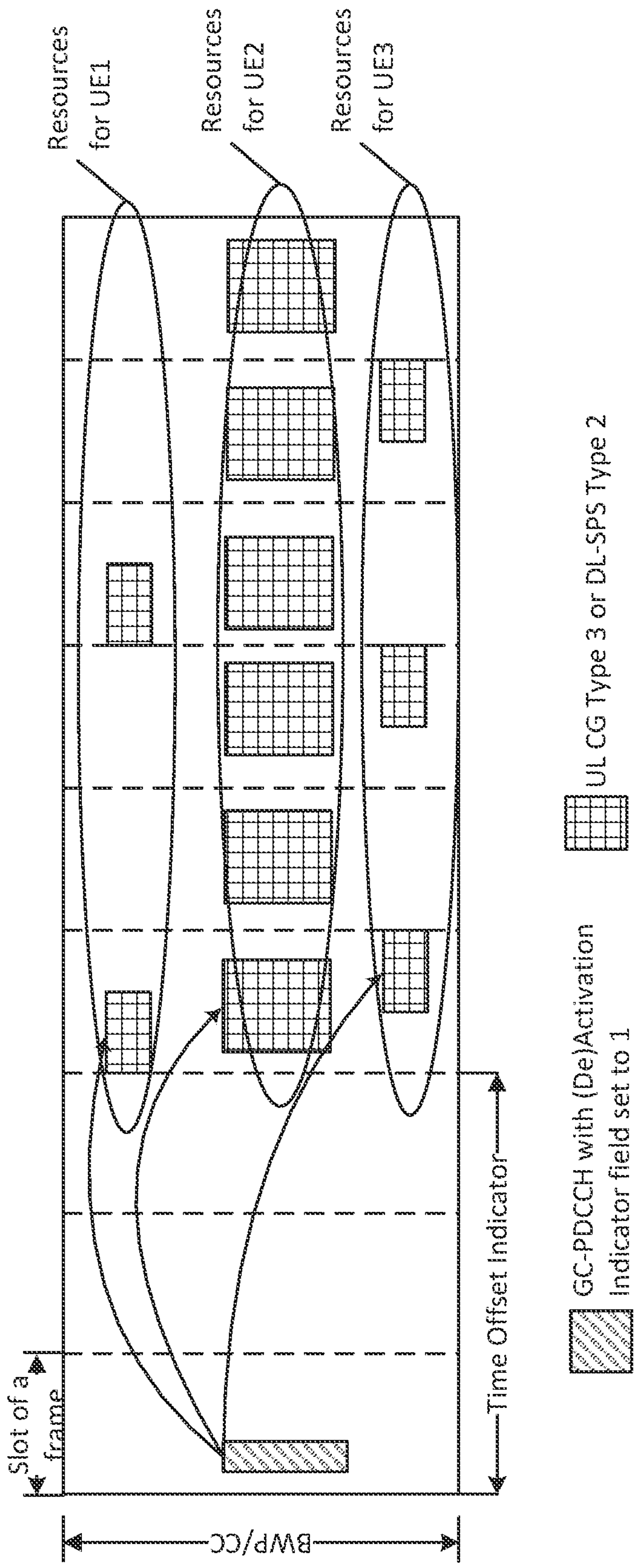
FIG. 4 is a time and frequency diagram of an example of using a GC-PDCCH to deactivate and/or activate UL CG Type 3 or DL-SPS Type 2 with Time Offset Indicator is signaled to all UEs.

Since the Time Offset Indicator field is commonly signaled to all UEs addressed by GC-PDCCH, then the same time offset may be applied as shown in FIG. 4, for example. It is worth mentioning that DL/UL configured grant start within the same slot for all UEs addressed by GC-PDCCH, other configurations may differ from one UE to another. For example, periodicity, time domain allocation, frequency domain allocation, etc., may be different as shown in FIG. 4.

In general, gNB may configure reduced capability NR device with multiple DL-SPS Type 2 and UL CG Type 3 grants. To address this, the GC-PDCCH may indicate the index of deactivated and/or activated grant. As one alternative, GC-PDCCH may carry additional field to indicate the index of deactivated and/or activated grant which is shared by all UE receiving this GC-PDCCH. Table 8 of the Appendix shows an example of the fields of GC-PDCCH which has Grant Index field to indicate which DL/UL grant is deactivated and/or activated. Other fields are similar to the depicted ones in the previous examples.

For the size of Grant Index field, gNB may configure it by higher layer signaling such as RRC. Alternatively, or when such configuration is absent, UE may derive the size based on the number of configured DL/UL grants. For example, if the GC-PDCCH is for deactivation and/or activation of DL or UL grants, then the bit width of Grant Index field is given by $\log_2$(number of DL grants) or $\log_2$(number of UL grants), respectively. In this case, Grant Index field indicates the index of the DL/UL grant to be deactivated and/or activated.

Moreover, the bit width of Grant Index field may be equal to the number of configured DL/UL grants which is beneficial for deactivation and/or activation of multiple grants at the same time. For example, the most significant (left) bit represents the configured DL/UL grant with the highest index, and the second most significant (left) bit represents the configured DL/UL grant with the second highest index and so on. If the bit width of Grant Index is more than the number of configured DL/UL grant, then some bits are not mapped to any grant. For example, remaining least significant bits are not mapped to any grant.

Also, gNB may configure the UE with a list of multiple configured DL/UL grants where each one or subset of them is associated with a particular grant index through higher layer signaling. In this case, the Grant Index field in DCI payload of GC-PDCCH may indicate one or multiple configured DL/UL grants to be deactivated and/or activated. The bit width of the Grant Index field may be equal to $\log_2$ (the list size) or equal to the list size itself where may deactivate and/or activate multiple grant at the same time.

As yet another solution, gNB may transmit multiple Grant Index fields to each UE or sub-group of UEs through GC-PDCCH. This is beneficial because gNB can indicate different configured DL/UL grant indices to different UEs or sub-group of UEs within the same GC-PDCCH. Other fields may be shared between all the UEs receiving GC-PDCCH such as DL/UL Indicator field, Activation Indicator field, and Deactivation Indictor field for example. Table 9 of the Appendix shows an example of GC-PDCCH fields.

Each UE or sub-group of UEs needs to know which field carries the indices of the deactivated and/or activated DL/UL grants. Therefore, gNB may configure the UE or sub-group of UEs information about the location of the field in GC-PDCCH that the UE should consider. For example, gNB may transmit higher layer signaling such as RRC parameter Grant_positionInDCI to point to the start position of Grant Index_m, $m \in \{0, 1, \ldots, N\}$, within the DCI payload of GC-PDCCH. The bit width of Grant Index_m may indicated/derived as described above, or it may be predefined e.g., provided in the specs. Moreover, gNB may provide the UE with the total length of the DCI payload through higher layer signaling such as RRC parameter CG DCI PayloadSize. One value (codepoint) of the Grant Index_m field may be reserved to indicate no change (activation or deactivation) should be applied by the UEs or the sub-group of UEs that monitor Grant Index_m. For example, all zeros or all ones may be used. This approach may be beneficial if gNB needs to activate or deactivate the grant of particular sub-group while keep the remaining sub-groups without any changes.

Moreover, other fields may be as DL/UL Indicator field, Activation Indicator field, and Deactivation Indictor field for example may separately for each UE or sub-group of UEs. For example, through the same GC-PDCCH, gNB may activate the configured DL/UL grant for some UEs while deactivating the configured grant for another set of UEs. Table 10 of the Appendix shows an example of DCI payload of GC-PDCCH where dedicated activation and deactivation indicator fields for each UE or sub-group of UEs. Specifically, each Grant Index field is associated with dedicated activation and deactivation fields. The position of Grant Index fields may be indicated as described above. The position of the dedicated activation and deactivation fields in the DCI may be indicated in as same as the position of Grant Index field through higher layer signaling. Alternatively, UE may derive their positions based on the position of Grant Index field. For example, the position of the activation and deactivation fields may be two bits before the beginning of Grant Index as illustrated in Table 10.

Alternatively, the Activation Indicator and Deactivator Indicator fields may for different UEs or sub-group of UEs may be occupy consecutive bits as shown in Table 11 of the Appendix. To let the UE know the position of the associated (De)Activation Indicator fields in DCI payload of GC-PDCCH, gNB may configure the UE with their position in DCI through higher layer signaling such as (De)Activation-fiositionInDCI. It may be enough that gNB just point the position of one field (Activation Indicator or Deactivation Indicator) and UE may derive the relative position of The second field (Deactivation Indicator or Activation Indicator, respectively). For example, it may occupy the consecutive bit. Attentively, gNB may configure the UE with its index or the sub-group index through higher layer signaling which allows the UE to know the position of its associated bit within the DCI payload as shown in Table 11 for example. For the position of Grant Index, it may be provided as described above. As another alternative, gNB may configure the UE with size of Grant Index which may be the same for all Grant Index_m, m E {0, 1, . . . , N}, through higher layer signaling. Then UE may use information about the configured UE index or sub-group index and the size of Grant Index field to derive the position of the field with the DCI payload. In other words, the DCI payload of GC-PDCCH is divided into blocks based on the configured UE index or sub-group index. Therefore, once the UE knows its index, the UE can allocate relavant fields in the DCI payload.

Though in the previous examples of Activation Indicator and Deactivation Indicator fields are part of the DCI payload of GC-PDCCH, it is also possible to replace both fields with just one field. When this field is toggled, then UE may assume that status (active or not active) of the configured grant is toggled as described above in more details. Or as another alternative, the one-field may use configured or predefined (provided in the specs) to activate or deactivate configured UL/DL grant. For example, if the one-bit field is set to "1", then the configured DL/UL grant is activated and if it is set to "0", then the configured DL/UL grant is deactivated.

Instead of having fields to indicate the activation or deactivation of the configured grant, the scrambling RNTI may indicate whether this GC-PDCCH is for activation or deactivation. The gNB may configure the UE with activation RNTI and deactivation RNTI through higher layer signaling such as RRC parameter Activation-RNTI and deactivation-RNTI. GC-PDCCH may carry Grant Index field to indicate which CG is deactivated and/or activated. Also, different RNTIs may be used to indicate whether GC-PDCCH is for the uplink or downlink grant instead of using "DL/UL Indicator" field.

Though gNB may scramble CRC of GC-PDCCH with particular RNTI for different purposes as described above, gNB may still configure the UE with CS-RNTI through higher layer signaling. In this case, UE may interpret GC-PDCCH scrambled with CG-RNTI-r17, Activation-RNTI, de-activation-RNTI-DL de-activation-RNTI-UL, etc. is only for activation of configured DL/UL grant. However, for scheduling any retransmission, the PDCCH will be scrambled with CS-RNTI. In other words, PDCCH for the activation of DL/UL grant and PDCCH for scheduling retransmission are scrambled with different RNTI.

Instead of configuring CS-RNTI explicitly thorough higher layer signaling, UE may derive CS-RNTI based on its cell radio-network temporary identifier (C-RNTI) and RNTI used for activating DL/UL configured grant, e.g., DL-SPS Type 2 or UL CG Type 3. Some formulas may be used to derive CS-RNTI. For example, CS-RNTI=XOR (C-RNTI, CG-RNTI-r17).

For DL-SPS Type 2 and UL CG Type 3, the solutions described herein may also be applied for other enhancements of dynamic grant, configured DL/UL or trigger CSI report in this disclosure.

In an alternative embodiment, instead of having GC-PDCCH to activate DL-SPS Type 2, the PDSCH occasions may be activated automatically after receiving the RRC configurations by certain period. This period may be configurated through higher layer signaling or predefined (provided in the specs) which may be in absolute time, in units of orthogonal frequency division multiplexing (OFDM) symbols, slots, subframe, etc. With such information, UE knows the start of the first PDSCH occasion. The other aforementioned configurations such as periodicity and time/frequency domain resource allocation let the UE know the how many symbols are occupied and in which periodicity in which PDSCH occasion will be repeated.

Once such PDSCH occasions for DL-SPS are not needed, gNB may transmit UE-specific or group-common PDCCH to deactivate in any of the described ways throughout the disclosure or by other higher layer signaling such as RRC or RRC+MAC-CE.

As yet another possibility, UE may derive the monitoring occasions of PDSCH using some equations that may be function of its C-RNTI, ID, the ID of expected traffic, etc. For example, equations may be similar to the ones used to derive the monitoring occasion of paging PDCCH. However, these equations may be in determining the monitoring occasions for PDSCH reception itself rather than PDCCH as in paging.

Enhancement to Existing DL/UL Configured Grant

In NR Rel. 15-16, UL CG Type 2 and DL-SPS are deactivated and/or activated by UE-specific PDCCH which carries information about the time domain resource allocation, frequency domain resource allocation, MCS index, frequency hopping type, frequency hopping offset (for UL CG Type 2), etc. To address this, the gNB may transmit GC-PDCCH to simultaneously activate DL-SPS or UL CG Type 2 of a group of UEs where a set of the aforementioned parameters may be shared between those UEs.

Though the solutions described in this disclosure are presented for configured grant scheduling, they can be applied for dynamic grant scheduling as well.

As one alternative, GC-PDCCH may be have the fields similar to those in DCI format 0_0, 0_1, 0_2, 1_0, 1_1, or 1_2, but it is scrambled with another RNTI that gNB may configure through higher layer signaling. Some of those field may be applied by all UE receiving GC-PDCCH. For example, the "modulation and coding scheme" may be applied by all UEs receiving GC-PDCCH because, most likely, they experience comparable/similar channel conditions and the indicated MCS index should work for all of them.

Figure 5:
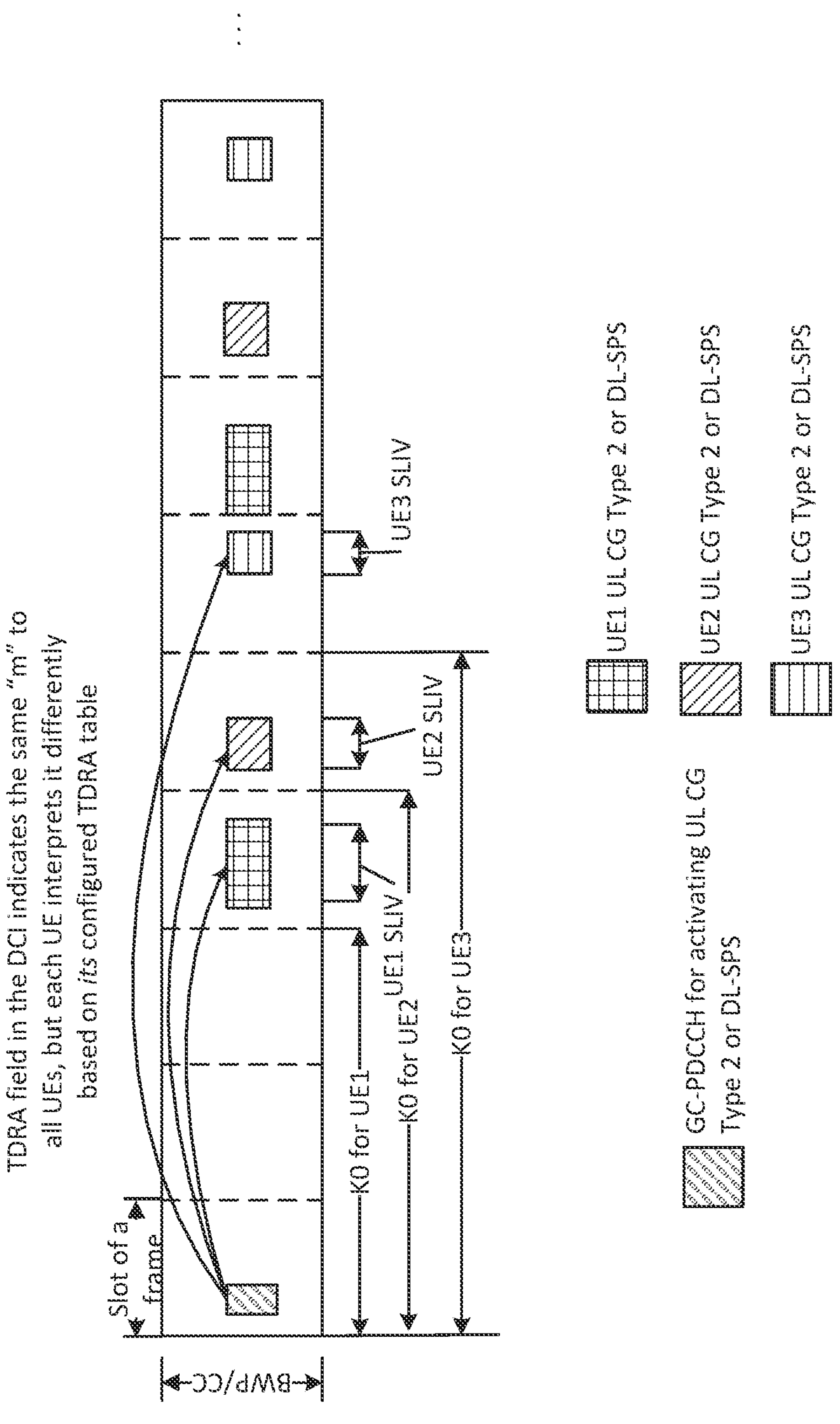
FIG. 5 is a time and frequency diagram of an example of using a provided TDRA value is mapped to different time domain resources by different UE.

Moreover, fields such as "time domain resource assignment (TDRA)" may be acceptable to be shared by all UE receiving because each UE will map the indicated value m provided by DCI payload in GC-PDCCH to row index m+1 in its own configured time domain resource allocation table provided in pdsch-Config for example. This is exemplified in FIG. 5 which shows that same TDRA value provided by GC-PDCCH is mapped to different KO and SLIV for each UE receiving GC-PDCCH based on the configured TDRA table.

Figure 6:
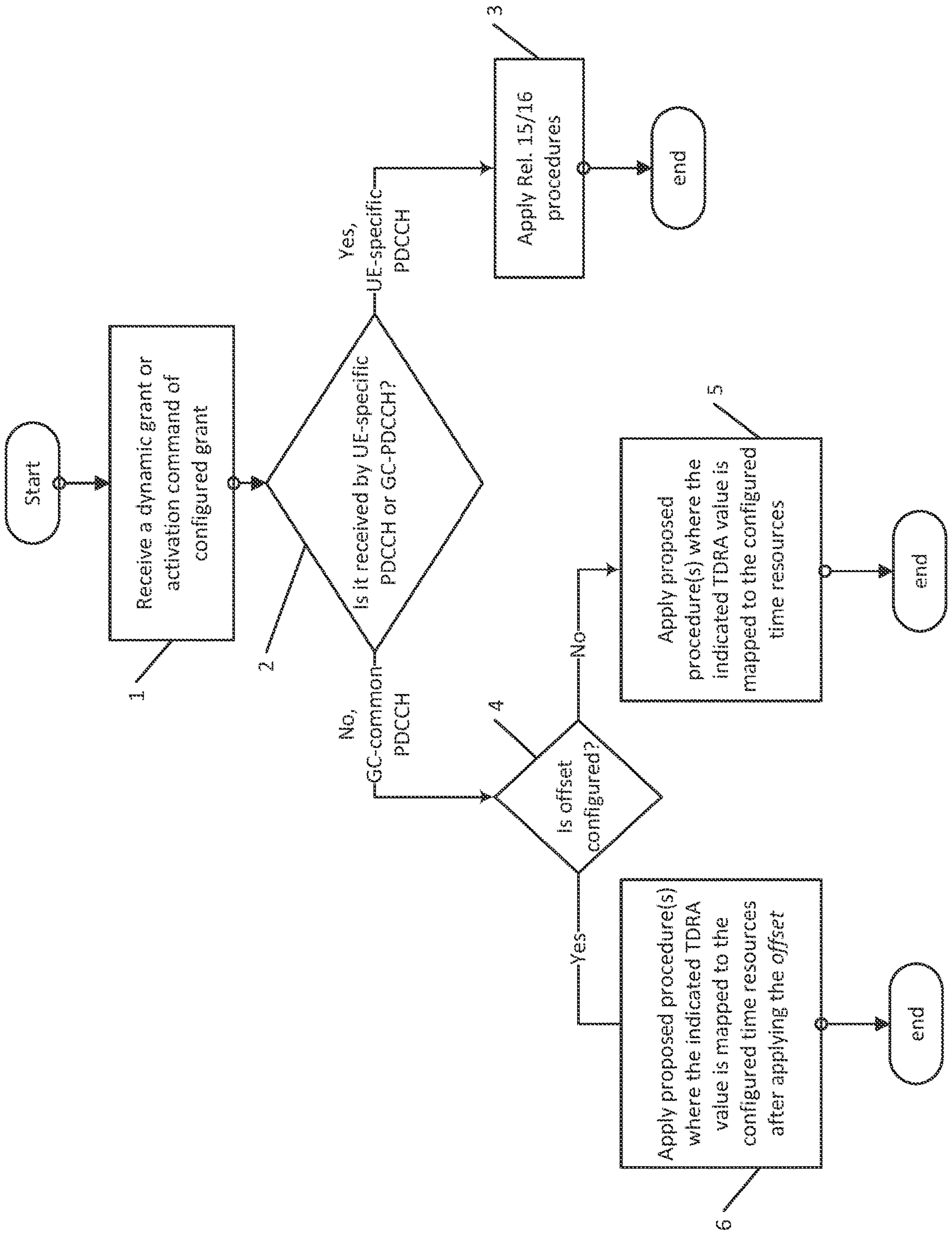
FIG. 6 is flow chart of an example procedures that a UE shall apply when receiving dynamic grant or activation command of configured DL/UL grant to determine time resources of the grant.

In general, this approach works well when the provided TDRA value in the DCI payload of GC-PDCCH maps to different time domain resources for different UEs based on the individually configured TDRA table for each UE. However, this may introduce some constraints on the scheduler to ensure that the indicated TDRA value always maps to non-overlapping resources in the time domain. To cope with this issue, the gNB may provide a set of UEs among those receiving GC-PDCCH with particular time offset to apply when they receive grant or activation command through GC-PDCCH. This offset may be configured through higher layer signaling such as RRC or RRC+MAC-CE. For the latter option, gNB may provide the UE with multiple offset values through RRC and then use MAC-CE to select which offset value to be applied. The offset value may be units of slot, OFDM symbol, etc. Please note that not all UEs receiving GC-PDCCH should be configured with an offset value, only a subset of them. Then the UE behavior depends on whether this parameter is configured or not as shown in the flow chart in FIG. 6.

In step 1, UE receives PDCCH that provides dynamic grant or activates configured DL/UL grant. Then UE check whether the received PDCCH is a UE-specific PDCCH or GC-PDCCH as depicted in step 2. If it is a UE-specific PCDCCH (yes in step 2), then UE applies the legacy behavior in NR Rel. 15/16 to determine the time domain resources of dynamic/configured grant.

If the received grant or the activation command is received by GC-PDCCH (no in step 2) and the offset value is not provided (no is step 4), UE map the provided TDRA m value to row index m+1 in its own configured time domain resource allocation table, provided in pdsch-Config for example, to derive the location of the provided grant. Otherwise, if the received grant or the activation command is received by GC-PDCCH (no in step 2) and the offset value is provided (yes is step 4), UE map the provided TDRA m value to row index m+1 in its own configured time domain resource allocation table, provided in pdsch-Config for example, and then add the offset value to actual location of the grant.

Figure 7:
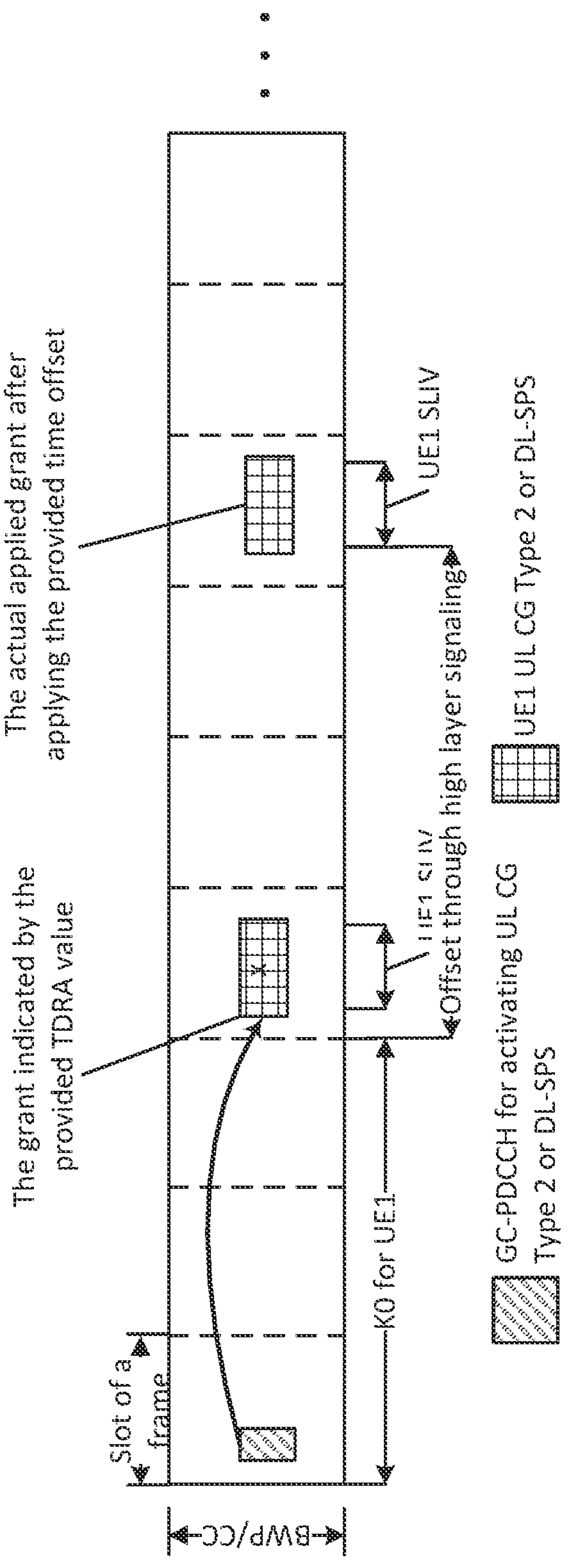
FIG. 7 is a time and frequency diagram of an example of shifting the location of the indicated grant by the offset value provided through higher layer signaling.

FIG. 7 shows an example for a UE that receives the grant through GC-PDCCH and is provided with an offset value through higher layer signaling. In this case, the UE applies the time offset to the indicated grant. The offset may be relative to the slot that carrying the grant or its first occasion as shown in FIG. 7. Also, the offset may be relative to the beginning of the grant itself. Alternatively, the offset value may be added to the indicated KO or the start symbol provided by the SLIV value indicated by TDRA carried in the DCI.

As yet another option or possibility, gNB may provide the UE with another TDRA table that should be used when the grant or the activation command is provided through GC-PDCCH. For example, higher layer parameter such as pXsch-TimeDomainAllocationList-GroupScheduling-r17, X∈{d, u}, may be included in P XSCH-ConfigCommon or PXSCH-Config.

Moreover, gNB may provide the UE with an offset value through higher layer signaling. In this case, UE may apply this offset (as described above) on indicated time resource allocation provided by pdsch-TimeDomainAllocationList-GroupScheduling-r17.

Table 12 shows an example of which TDRA table that the UE should use when it receives dynamic grant or activation command through GC-PDCCH. In general, if gNB provides the UE with a dedicated TDRA table for such scheduling, the UE should apply it. Otherwise, UE may apply TDRA table used for grant provided/activated by UE-specific PDCCH.

Alternatively, the gNB may provide multiple TDRA value in DCI payload of GC-PDCCH to different UEs or sub-groups of UEs. Each one may apply the indicated TDRA by its corresponding TDRA field. To let the UE knows which TDRA field should be used, the gNB may configure the UE with location of its TDRA field withing GC-PDCCH. For example, higher layer signaling, such as RRC parameter TDRApositionInDCI for example, may point to the start position of TDRA field with the DCI payload of GC-PDCCH. The bit width of the TDRA field may be fixed and predefined e.g., provided in the specs, or it may be signaled through higher layer signaling such as RRC parameter TDRA size. Please note that other solutions described to Grant Index field in GC-PDCCH may be applied as well for the TDRA field.

As another solution to resolve the collisions between the grants provided by GC-PDCCH for different UEs is to allocate different frequency domain resources for each UE. Specifically, the same TDRA value may point to the same time domain resources for DL/UL grant for the UEs receiving the grant or the activation command through GC-PDCCH, but the grants may be frequency domain multiplexed (FDMed) as shown in FIG. 8 for example.

Figure 8:
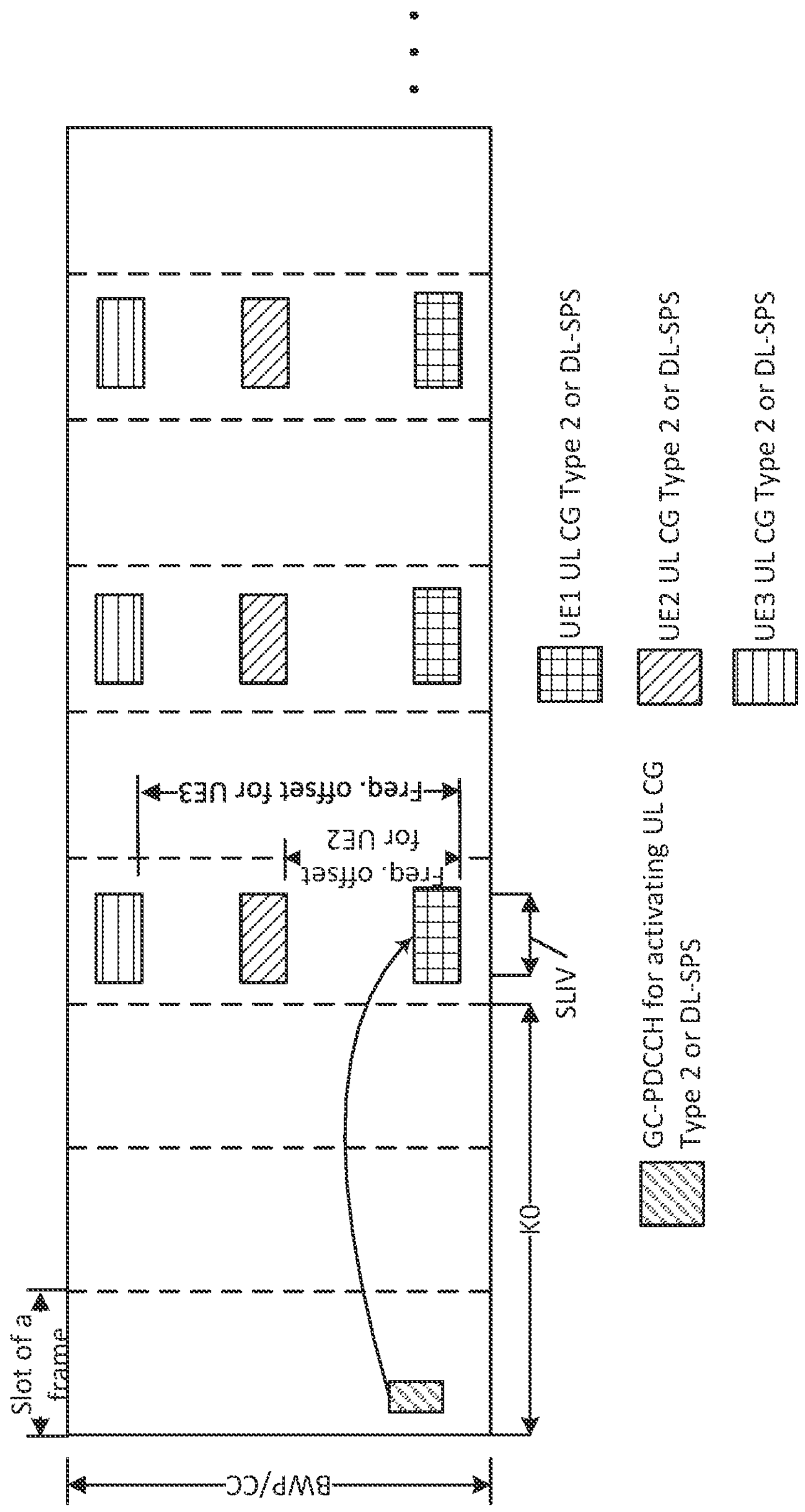
FIG. 8 is a time and frequency diagram of an example where GC-PDCCH provides a single FDRA, and each UE apply particular frequency offset provided through higher layer signaling.

GC-PDCCH may provide the same frequency domain allocation through a single frequency domain resource assignment (FDRA) field as depicted in FIG. 8. Each UE may apply particular frequency domain offset such that the allocated resources for the grant do not collide even if the same time domain resources are used. gNB may provide each UE or sub-group of UEs with the frequency domain offset through higher layer signaling, such as RRC parameter freq_offset.

The frequency offset value may be between the first RB indicated by FDRA and the first RB of the shifted location of PXSCH, where PXSCH is used for brevity and can correspond to PDSCH or physical uplink shared channel (PUSCH). The number of occupied RBs in all shifted location of PXSCH may be the indicated number of RBs indicated by FDRA field. In other words, the number of RBs of PXSCH for each UE is the same, but they are shifted by freq_offset. Though in FIG. 8 the offset is between the beginning of PXSCHs of different UEs, in general, the offset may be defined to be between any two RBs of PXSCH of those UEs. For example, the offset may be between the last RB of PXSCH of particular UE and the first RB of PXSCH of another UE.

Figure 9:
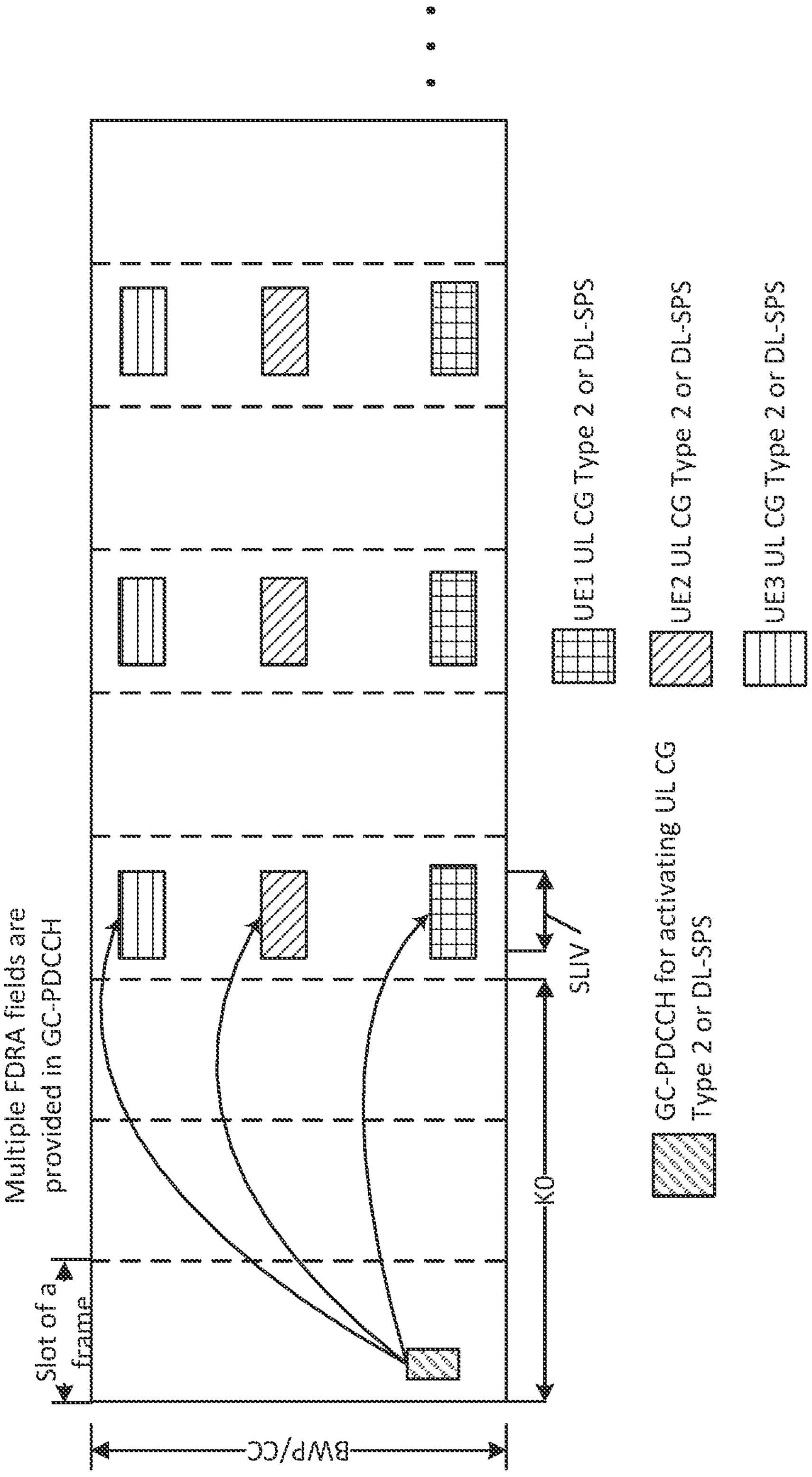
FIG. 9 is a time and frequency diagram of an example where GC-PDCCH provides different FDRAs to different UE.

Alternatively, GC-PDCCH may provide multiple FDRA fields to different UEs or sub-groups of UEs to indicate different FDMed resources as shown in FIG. 9. Specifically, gNB may configure different sub-groups of UEs with position of FDRA field that they should apply through higher layer signaling, such as RRC parameter FDRA_positionInDCI for example, which may point to the start position of FDRA field with the DCI payload of GC-PDCCH. The bit width of the FDRA may be derived using the same rules applied in NR Rel. 15/16. Also, the bit width may be predefined, e.g., provided in the specs, or configured through higher layer signaling such as RRC parameter FDRA size. Some restriction may be applied on FDRA fields for reduced capability NR devices such as only one UL/DL frequency domain resource allocation is used, either typo 0 or type 1.

In the example in FIG. 9, though GC-PDCCH indicates the same time domain resource allocation of the DL/UL grant, GC-PDCCH provides different FDRA values for different UE. This is beneficial to avoid any collisions between provided/activated grants of different UEs that receive the same GC-PDCCH.

As yet another possibility, the DCI payload of GC-PDCCH may indicate a time-frequency resource block through TDRA/FDRA corresponding to the resource allocation for all UEs in the group. Each UE may figure out which RBs/symbols that are allocated to itself through a procedure involving e.g., the UE index within a group and a total number of UEs in group, or the UE index within a group and the number of RBs*symbols allocated to each UE in the group. By defining time-first or frequency-first UE mapping, the UEs could find their allocated resources for PXSCH.

To indicate whether GC-PDCCH activates or deactivates DL/UL configured grant, some of the aforementioned solutions may be applied such as introducing new fields to distinguish between different purposes of the GC-PDCCH. Also, other fields may be used to indicate which grant is deactivated and/or activated as shown in Table 13 of the Appendix for example. Or combination of different fields as in NR Rel. 15/16, such as HARQ process number field, redundancy version, modulation, and coding schemes, etc. See 3GPP TS 38.213.

Though gNB may scramble GC-PDCCH with particular RNTI for different purposes as described above, gNB may still configure the UE with CS-RNTI through higher layer signaling. In this case, UE may interpret GC-PDCCH scrambled with CG-RNTI-r17, Activation-RNTI, de-activation-RNTI-DL de-activation-RNTI-UL, etc. is only for deactivation and/or activation of configured DL/UL grant. However, for scheduling any retransmission, the PDCCH will be scrambled with CS-RNTI. In other words, PDCCH for the activation of DL/UL grant and PDCCH for scheduling retransmission are scrambled with different RNTI.

Instead of configuring CS-RNTI explicitly thorough higher layer signaling, UE may derive CS-RNTI based on its C-RNTI and RNTI used for activating DL/UL configured grant, e.g., DL-SPS or UL CG Type 2. Some formulas may be used to derive CS-RNTI. For example, CS-RNTI=XOR (C-RNTI, CG-RNTI-r17).

Piggybacked DCI

Figure 10:
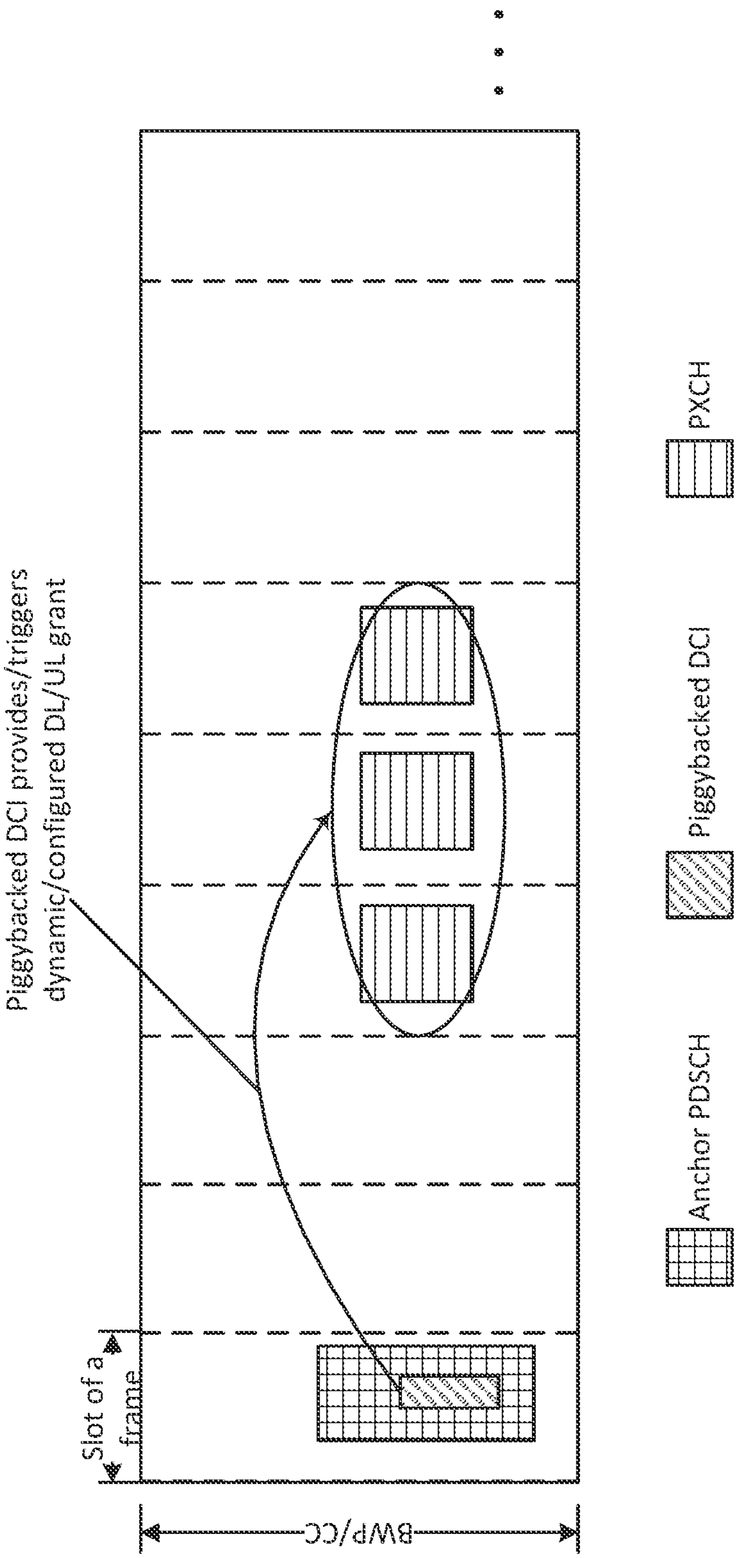
FIG. 10 is a time and frequency diagram of an example where an anchor PDSCH carries piggybacked DCI that provides dynamic DL/UL grant or trigger configured DL/UL grant.

The gNB may exploit the transmission of a PDSCH to schedule another dynamic DL/UL grant or deactivate and/or activate another configured DL/UL, e.g., DL-SPS or UL CG type 2 trough transmitting a piggybacked DCI on this PDSCH. We label the PDSCH that carries the piggybacked DCI as the anchor PDSCH because it is used to schedule, activate, deactivate another DL/UL channel/signal by carrying DCI payload as shown in FIG. 10. Using piggybacked DCI is beneficial as it frees some CCEs by transmitting DCI multiplexed on PDSCH, which in turn reduces the blocking probability. Moreover, it enables the UE to inherit some of the configurations from the anchor PDSCH which reduces the amount of information that needs to be carried by the piggybacked DCI.

Multiplexing DCI on PDSCH

The predefined (provided in specs) resource elements (REs) according to some rules within the anchor PDSCH may carry the piggybacked DCI.

Figure 11A:
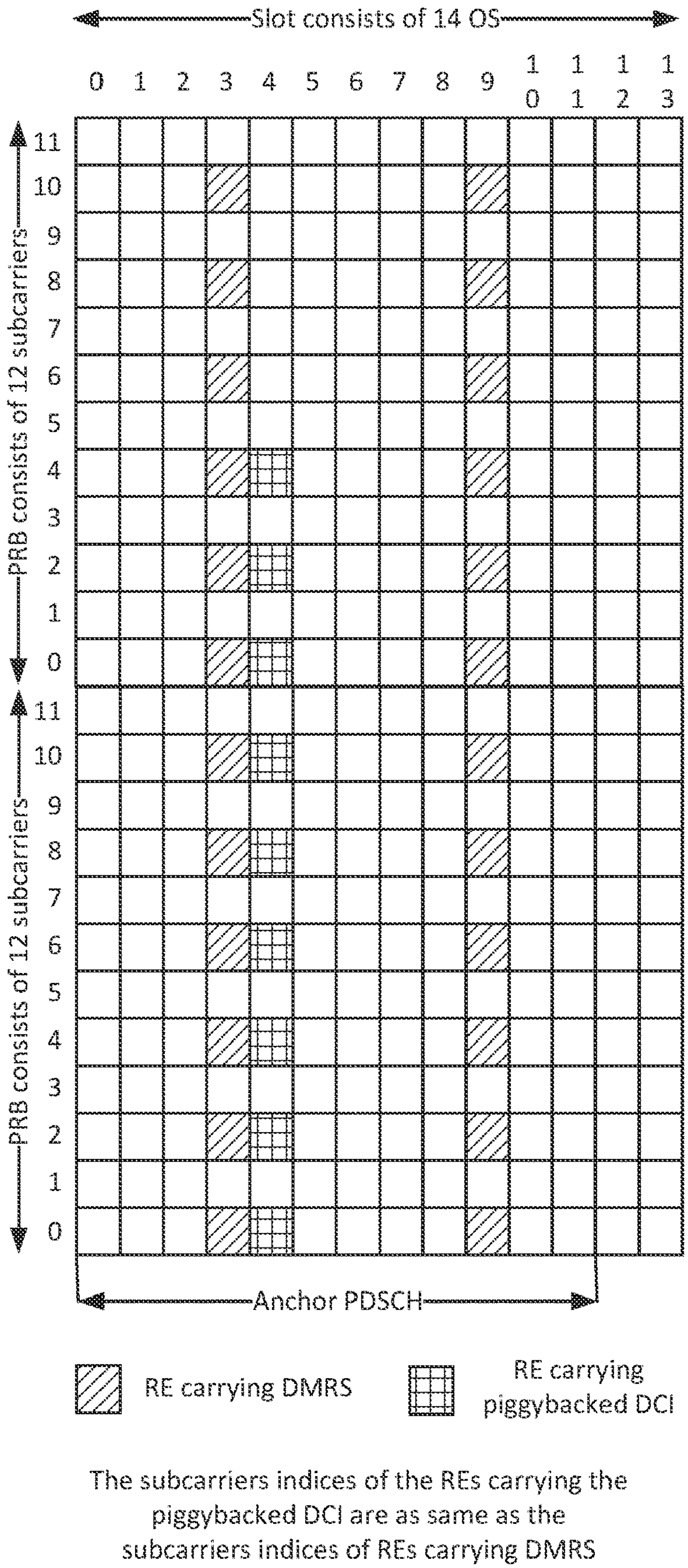
FIGS. 11A and 11B are time and frequency diagrams of examples where piggybacked DCI mapped to non-consecutive REs.
Figure 11B:
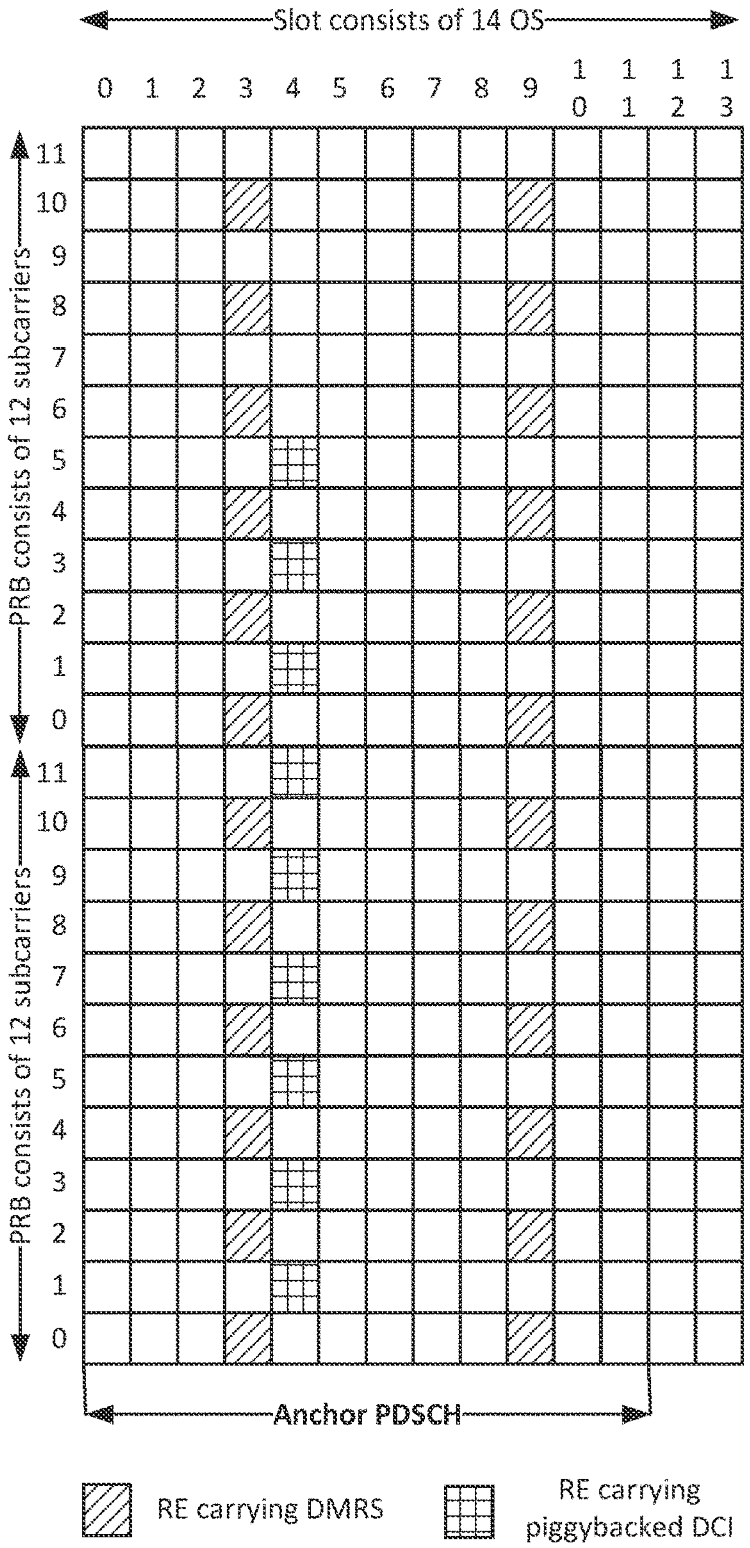

As one alternative, the piggybacked DCI may occupy non-consecutive REs which may be in the available OFDM symbol after the first demodulation reference signal (DMRS) symbol(s) (either single-symbol DMRS or double-symbol DMRS) as shown in FIG. 11 for example. The piggybacked DCI may also occupy the OFDM symbol before the first DMRS symbol or any other OFDM symbol within the anchor PDSCH.

The piggybacked DCI may occupy REs with the same subcarriers' indices as same as subcarriers' indices of REs carrying DMRS as shown on FIG. 11 (A), for example, and the mapping may start from the subcarrier in the anchor PDSCH. In other words, the piggy backed DCI is mapped to every other RE in the OFDSM after the DMRS symbol.

Other mapping patterns may be applied as well such as every third, fourth, fifth, etc., RE carries piggybacked DCI. Or piggybacked DCI may occupy multiple consecutive REs similar to DMRS type 2. In general, the mapping pattern of the piggybacked DCI may be different than the mapping patterns of DMRS of the anchor PDSCH. For example, the mapping pattern of piggybacked DCI may follow the mapping pattern of DMR type. Or it may be different and gNB can provide it through higher layer signaling such as RRC parameter piggybacked_DCI_mapping_pattern.

Alternatively, gNB may map the piggyback DCI to REs with particular shift from the first subcarrier in anchor PDSCH. FIG. 11 (B) shows an example where the subcarriers' indices of REs carrying the piggybacked DCI is shifted by 1 from the subcarriers' indices of the REs carrying DMRS. The shift value may be predefined (provided in the specs), or gNB may provide the offset value through higher layer signaling, such as RRC parameter Piggybacked_DCI_freq_offset. In general, the offset may be relative to any reference point within or outside the anchor PDSCH.

As shown in FIG. 11 for example, it is not necessary that that every RE within the mapping pattern should carry piggybacked DCI. As depicted in FIG. 11 the last few REs in the second RBs do carry piggybacked DCI. A number of alternatives are available.

In one alternative, gNB may provide the UE the number of REs used to carry the piggybacked DCI through higher layer signaling. For example, gNB may provide the absolute number of REs that may carry piggybacked DCI or provide the percentage of total number of RBs/REs of the anchor PDSCH. Then UE apply the mapping pattern based on the number of REs that may carry the piggyback DCI.

As another alternative, UE may derive the number of REs to carry the piggybacked DCI. For example, gNB may provide the UE with the size of the piggybacked DCI through higher layer signaling such as RRC parameter DCI_piggybacked_size. Then based on the MCS index used for the anchor PDSCH, UE may derive how many REs are needed to carry the piggybacked DCI.

For example, similar to the parameters in BetaOffsets IE, e.g., betaOffsetACK-Index1, betaOffsetCSI-Part1-Index, etc., another RRC parameter such as betaOffsetDCI. The indicated value "m" by betaOffsetDCI may be mapped row "m+1" in table of possible beta offsets of DCI when it is multiplexed on PDSCH. Such tables may be predefined (provided in the specs) similar to the tables of beta offset in 3GPP TS 38.213. Alternatively, new tables may be introduced. Once the betaOffsetDCI is known to the UE, it may apply certain equations to derive the exact number of symbols that will carry the piggybacked DCI.

Moreover, higher layer signaling may indicate whether the betaOffsetDCI is statically indicated through RRC parameter or it may be indicated dynamically through PDCCH. In this case, a new DCI field in either UE-specific PDCCH or GC-PDCCH to point which betaOffsetDCI should be applied out of provided betaOffsetDCI values provided through higher layer signaling. Alternatively, UE may apply the first value among those values provided through higher layer signaling without any indicated in the PDCCH that schedule or activate the grant.

Figure 12A:
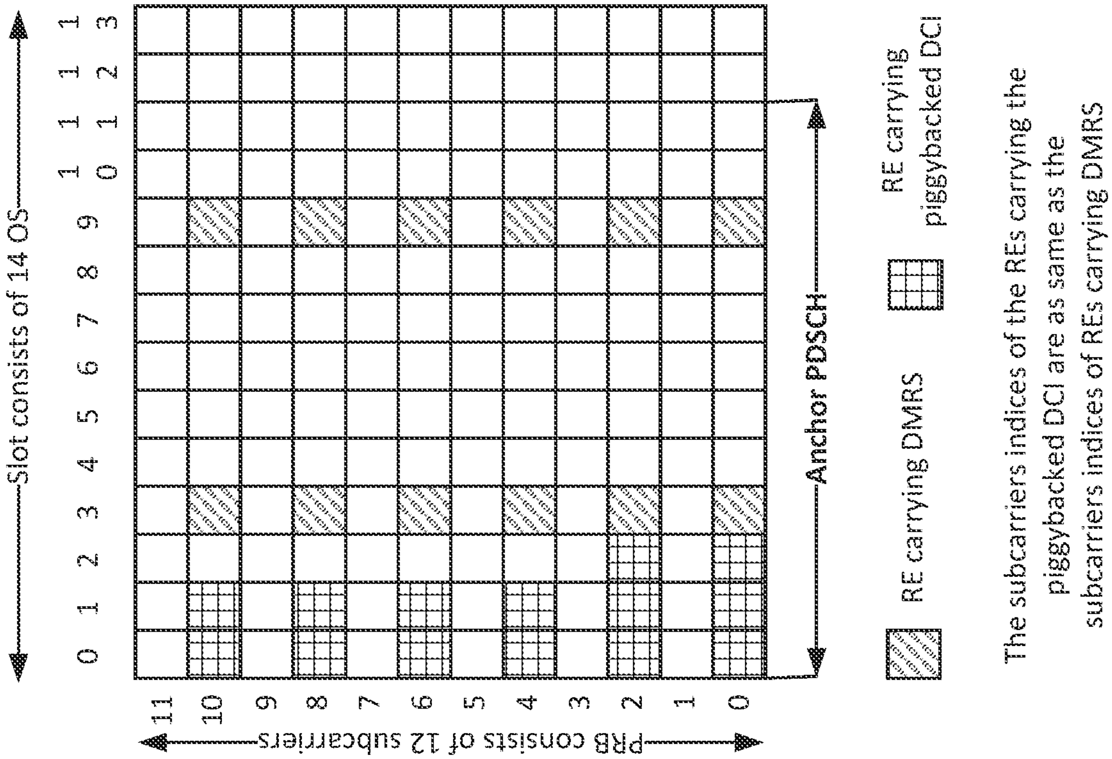
FIGS. 12A and 12B are time and frequency diagrams of examples where mapping the piggybacked DCI to multiple OFDM symbols starts from the beginning of an anchor PDSCH.
Figure 12B:
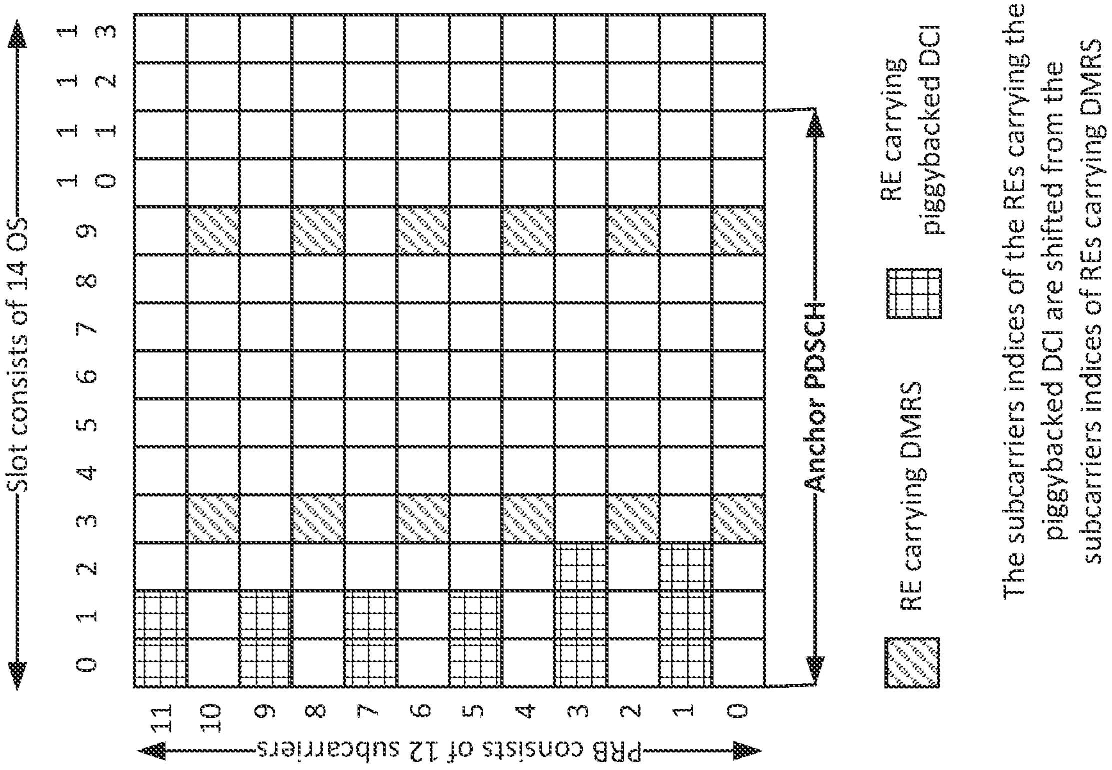

Though in the provided example, the piggybacked DCI is mapped to symbol after the DMRS symbol, piggybacked DCI may be mapped to other symbols within the anchor PDSCH. For example, the mapping may start from the first symbol of the anchor PDSCH as shown in FIG. 12 for example. As another possibility is that mapping the piggybacked DCI may start from the symbol before the first DMRS symbol. Also, gNB may provide the UE with the indices of OFDM symbol that may carry the piggybacked DCI through higher layer signaling relative the allocated resources of the anchor PDSCH.

The REs within one OFDM symbol may not be enough to carry the piggybacked DCI on the anchor PDSCH depending on the applied mapping pattern. Therefore, multiple consecutive/non-consecutive OFDM symbols may be used to carry as shown in FIG. 12 for example. The mapping may be done in the frequency first, then time second.

Though in the previous example no piggybacked DCI is mapped to the REs within the DMRS symbol, i.e., no piggybacked DCI is mapped to the REs in the symbol carrying DMRS, in general, DMRS symbol may also be used to carry the piggybacked DCI as well.

Figure 13:
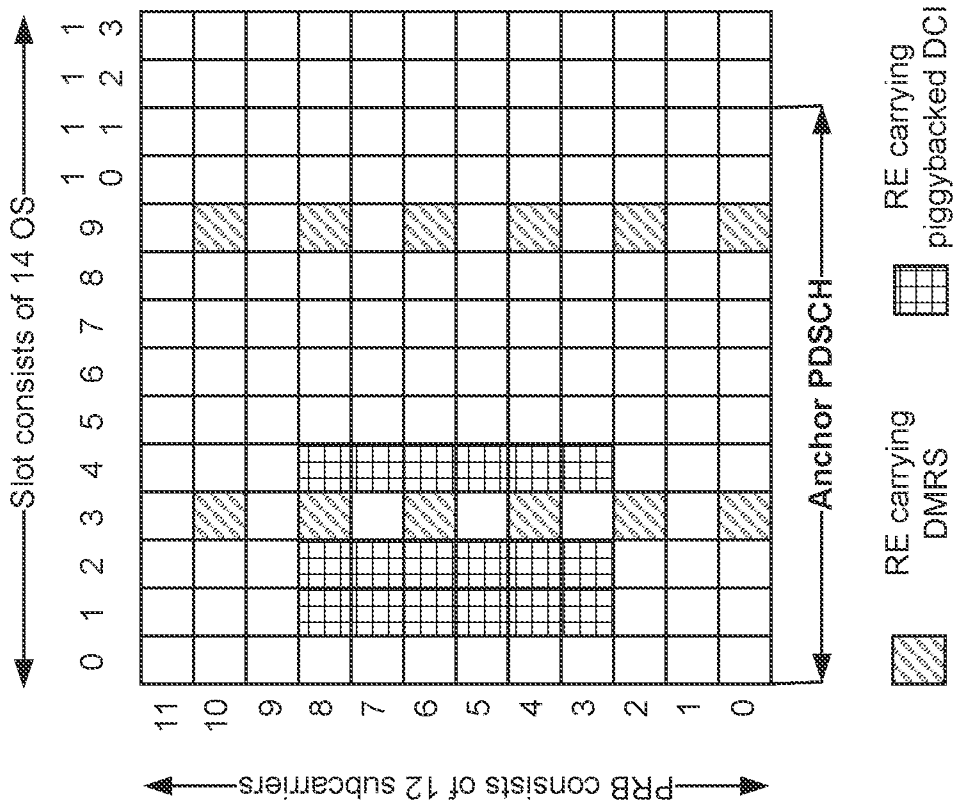
FIG. 13 is a time and frequency diagram of an example where a piggybacked DCI is mapped to non-consecutive REs.

Another alternative is to map the piggybacked DCI to consecutive REs as shown in FIG. 13 as an example. As one possibility, the mapping may start from the closest OFDM symbol to the first DMRS symbol(s) first to the furthest OFDM symbol from the first DMRS symbol(s) within the anchor PDSCH. If two OFDM symbols have the same distance from the DMRS symbol, then OFDM symbol with the smaller index is mapped first. In the example, in FIG. 13, OFDM symbols {2, 4} have the same distance from the DMRS symbol, then the mapping starts from OFDM symbol 2 followed by OFDM symbol 4. Then OFDM symbols {1, 5} have the same distance, then then the piggybacked DCI is mapped to OFDM symbol 1 first and then OFDM symbol 5 if needed. In this example, only OFDM symbol 1 is used. Therefore, the mapping order is as follows 2→4→1.

The number of consecutive REs in any OFDM symbol may be predefined (provided in the specs), or gNB may provide it to the UE through the higher layer signaling. For example, gNB may provide the UE with the absolute number of REs in the center of anchor PDSCH that may carry the piggybacked DCI through higher layer signaling such as num_center_REs_piggybackedDCI. Alternatively, gNB may provide the UE with number of REs for the piggybacked DCI by indicating it as a percentage of the total number of REs of the anchor PDSCH. This percentage may be provided through higher layer signaling, or by using a beta offset parameter to indicate the number of REs needed to carry the piggybacked DCI as described above.

UE may determine the total number of needed REs to carry the piggybacked DCI using one of the aforementioned procedures.

Though in the previous examples we show single symbol-symbol DMRS, the same procedures may be applied for double-symbol DMRS.

Monitoring Piggybacked DCI

The UE know may be informed in a number of ways regarding PDSCH may be considered as anchor PDSCH which can carry piggybacked DCI.

For example, the gNB may indicate to the UE whether DCI is multiplexed on PDSCH through higher layer signaling such as RRC parameter DCI-onPDSCH for example. Or, through RRC+MAC-CE to indicate whether PDSCH can carry piggybacked DCI or not. Also, RRC+MAC-CE may be used for semi-persistent indication where one MAC-CE indicates that PDSCH transmitted within particular time window may carry piggybacked DCI until the end of this window which is indicated by another MAC-CE.

For dynamic anchor PDSCH that is scheduled through UE-specific PDCCH, the scheduling PDCCH may carry an indication on whether anchor PDSCH carrying piggybacked. For example, a one-bit field in the scheduling PDCCH may be used for this purpose. This bit may be from the reserved bits on the scheduling DCI or purposing some of the existing bits if they are not needed for scheduling the anchor PDSCH.

Figure 14:
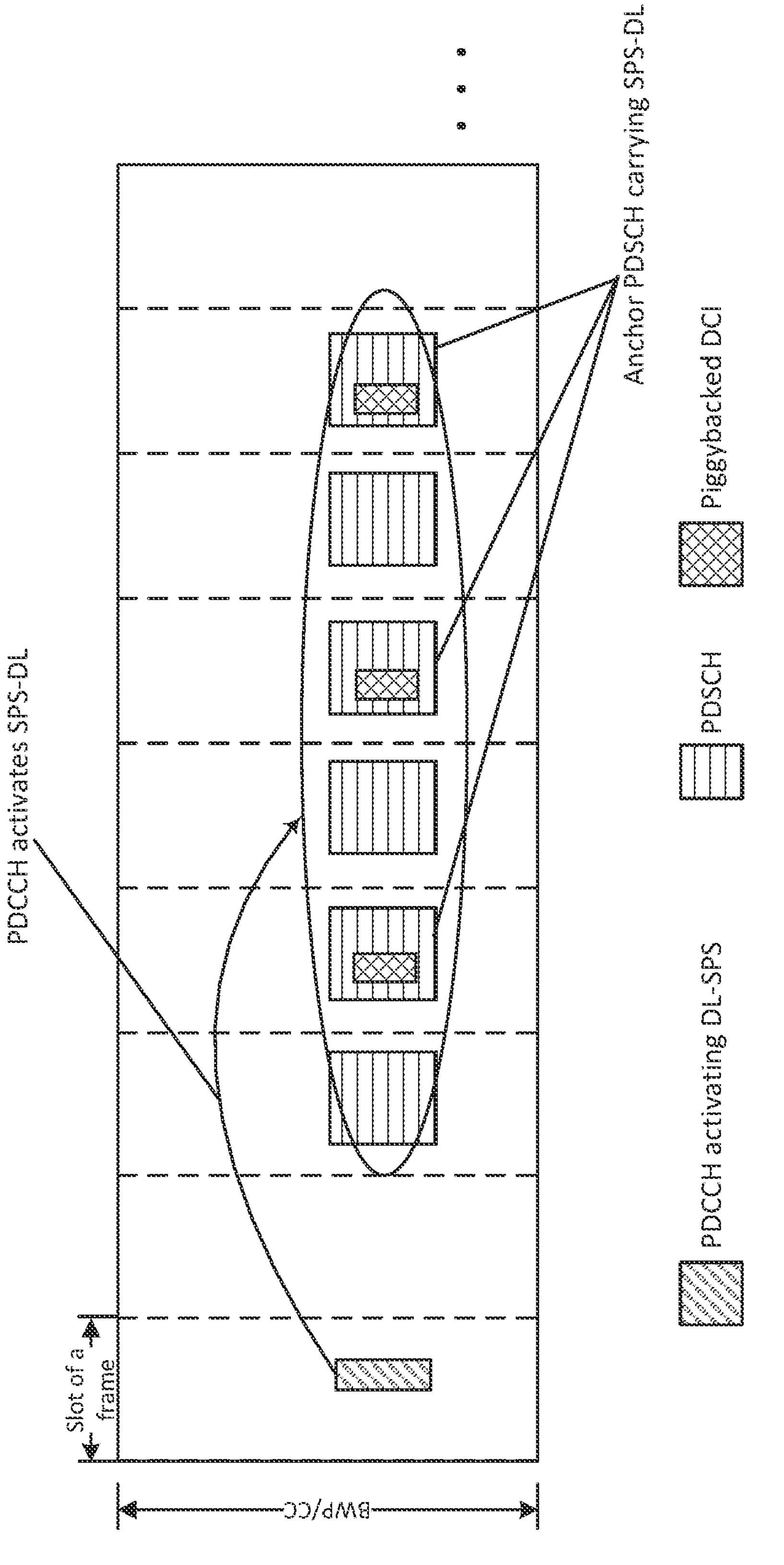
FIG. 14 is a time and frequency diagram of an example where piggybacked DCIs are piggybacked on anchor SPS-PDSCH.

For DL SPS, gNB may provide the UE with information on which SPS PDSCH may carry piggybacked DCI. In NR Rel. 15/16, gNB provides the UE with the periodicity of DL-SPS. FIG. 14 shows an example of DL-SPS with 1 slot periodicity. In this case, gNB may indicate which PDSCH that UE can consider as anchor PDSCH to carry piggybacked DCI.

As one possibility, gNB may provide the UE with such information through higher layer signaling such as RRC parameter anchor-PDSCH. When anchor-PDSCH is set to 0.5, then every other SPS PDSCH may be used as anchor PDSCH as shown in FIG. 14. If anchor-PDSCH is set to 0.25, then every fourth SPS PDSCH may be used as anchor PDSCH and so on. Also, the gNB may indicate which PDSCH occasions that UE may consider as an anchor PDSCH through bit map which is provided through higher layer signaling. Each bit in the bit map correspond to one PDSCH occasion and then the bit map is repeated until the deactivation of SPS-PDSCH. For example, if the bit correspond to particular PDSCH occasion is set to one, UE may assume that this occasion is anchor PDSCH.

Alternatively, gNB may provide the UE with periodicity of the anchor PDSCH with the activated DL-SPS through higher layer signaling such as RRC parameter anchor-PDSCH-period starting from the first PDSCH SPS. The periodicity may in units of slot, OFDM symbol, absolute time, etc. In the example in FIG. 14, anchor-PDSCH-period is set to two slots.

As yet another possibility, gNB may provide the UE with information about anchor PDSCH through RRC+MAC-CE, RRC+DCI, or RRC+MAC-CE+DCI. In the solution based on RRC+MAC-CE, gNB may have certain level of flexibility to update the periodicity of the anchor PDSCH, but this requires the decoding of PDSCH that carries MAC-CE. On the other hand, the solution based on RRC+DCI alleviates the need of MAC-CE by directly indicating the value through DCI which points to one value of multiple values configured through RRC at the cost of needing a dedicated control field in DCI format. The solution based on RRC+MAC-CE+DCI aims to achieve a balance between the aforementioned trade-offs. For example, gNB may provide the UE with multiple periodicity of the anchor PDSCH and then uses the activating PDCCH to indicate which periodicity is used in the activated DL-SPS.

The fields of the piggybacked DCI depend on its purpose. Therefore, the fields of the DCI payload of GC-PDCCH may also be the fields used for the piggybacked DCI. If the piggybacked DCI is used for both dynamic scheduling and configured grant, then additional one-bit field may be used for differentiation. Alternatively, gNB may indicate such information to the UE through higher layer signaling such as RRC parameter piggybacked-DCI-purpose which can indicate whether it will be used for dynamic grant or configured grant.

It may happen that for any anchor PDSCH, gNB does not need to transmit piggybacked DCI. To address this, a special indication to let the UE know that there is no piggybacked DCI is transmitted. As one alternative, gNB may transmit the piggybacked and set some fields to particular value. For example, all the fields of the piggybacked DCI may be set to all zeros.

As another alternative, special DMRS sequence, port, configuration, etc., may be used to indicate whether the anchor PDSCH carries piggybacked DCI or not. For example, if the legacy initialization sequence of DMRS may be used when anchor PDSCH carries piggybacked DCI. Another DMRS initialization sequence may be used to indicate that the anchor PDSCH does not carry piggybacked DCI. For additional DMRS initialization sequence associated with no piggybacked DCI, gNB may provide it to the UE through higher layer signaling such as RRC parameter piggybacked-DCI-ScramblingID.

For the anchor PDSCH that carried the piggybacked DCI, UE may assume that PDSCH is rate matched around the REs occupies by the piggybacked DCI. Or UE may assume that REs carrying PDSCH are punctured when they collide with REs supposed to carry piggybacked DCI.

Inheriting Anchor PDSCH Configurations

To reduce the overhead the piggybacked DCI and the number of needed REs within the anchor PDSCH, some of the configurations of the anchor PDSCH may be applied to the PXSCH that is scheduled/activated by piggybacked DCI.

As one possibility, UE may assume that MCS index of the anchor PDSCH is used for the scheduled PXSCH and hence the "modulation and coding scheme" is not needed to be indicated. In turn, this reduces the size of the piggybacked DCI.

Similarly, the TDRA or FDRA value of the anchor PDSCH may be applied for the scheduled/activated PXSCH. Which may further reduce the size of the piggybacked DCI.

The gNB may indicate to the UE which configurations are shared between the anchor PDSCH and the PXSCH that is scheduled/activated by the piggybacked DCI. This may be done through higher layer signaling such as RRC parameter shared-confs that may take values such as MCS, TDRA, FDRA, etc., or any combination of thereof.

Instead of introducing piggybacked DCI, new DCI formats may be used that have smaller size than DCI formats in NR Rel. 15/16 to schedule or provide deactivation and/or activation command of DL/UL configured grant. With smaller size payload, the number of needed CCEs to carry PDCCH may be reduced which enables gNB to schedule reduced capability NR devices through UE-specific PDCCH while using less CCEs. The new DCI formats may contain the fields described above which are essential for activation and deactivation of configured grant.

These new DCI formats may be scrambled with C-RNTI or CS-RNTI, but for rescheduling legacy PDCCH scrambled with CS-RNTI may be used.

Triggering Aperiodic CSI

A number of solutions are available to enable gNB to trigger aperiodic CSI reporting for a group of UEs instead of using UE-specific PDCCH for each individual UE. The framework is similar to the framework of scheduling/providing deactivation and/or activation command to a group of UEs described above.

The gNB may use GC-PDCCH to trigger aperiodic CSI report. A field similar to "CSI request" field may be included in the DCI payload of GC-PDCCH which may be labeled as "GC CSI request" field. The position of "GC CSI request" may be configured through higher layer signaling such as RRC parameter GC_CSI_request_positionInDCI to point to the start position within the DCI payload of GC-PDCCH.

DCI payload of GC-PDCCH may include one "GC CSI request" field that is applied for all UEs receiving GC-PDCCH. Also, the DCI payload of GC-PDCCH may include multiple "GC CSI request" field for each UE or sub-group of UEs receiving GC-PDCCH. The aforementioned solutions on how to indicate the position of "Grant Index," "Activation Indicator," "Deactivation Indicator," "TDRA," "FDRA," etc. in DCI payload may be applied for "GC CSI request" field.

All the aforementioned solutions on how to GC-PDCCH above may be applied here as well, e.g., using dedicated RNTI, CORESET, search space set, etc. For example, GC-PDCCH that carries GC CSI request field may have a dedicated RNTI differ from the RNTI for GC-PDCCH used for providing dynamic grant or provide deactivation and/or activation command of configured grant.

Alternatively, GC PDCCH may field to indicate the purpose of GC-PDCCH and hence the UE knows how to interpret its fields. Table 14 of the Appendix shows an example of such field.

Since gNB needs to provide the UEs with UL grants to transmit CSI report, procedures similar to those described above may be applied. For example, the aforementioned solutions on how to provide non-colliding grants may be applied such that each UE can report CSI without colliding with any other UEs.

In case of the need of a retransmission of PUSCH carrying CSI report, UE expects to be scheduled with UE-specific PDCCH scrambled with C-RNTI.

Similarly, piggybacked DCI on anchor PDSCH may be used to trigger aperiodic CSI reports where additional field of CSI request is included in GC-PDCCH. All the aforementioned solutions related to where and when to monitor the piggybacked DCI and all other details may be applied here as well.

Moreover, a purpose field similar to Table 14 may be included in the piggybacked DCI to indicate the purpose of the piggybacked DCI.

Triggering Semi Persistent CSI Reporting on PUSCH

All of the aforementioned solutions may be applied for triggering semi-persistent CSI reporting. The key difference is that the GC-PDCCH or the piggybacked DCI may need to carry indication to its purpose or "purpose" indicator, for either activation or deactivation of semi-persistent CSI reporting. Therefore, solutions similar to all the solutions described herein for activating or deactivating DL/UL configured grant may be applied.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G." 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V21), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 15A:
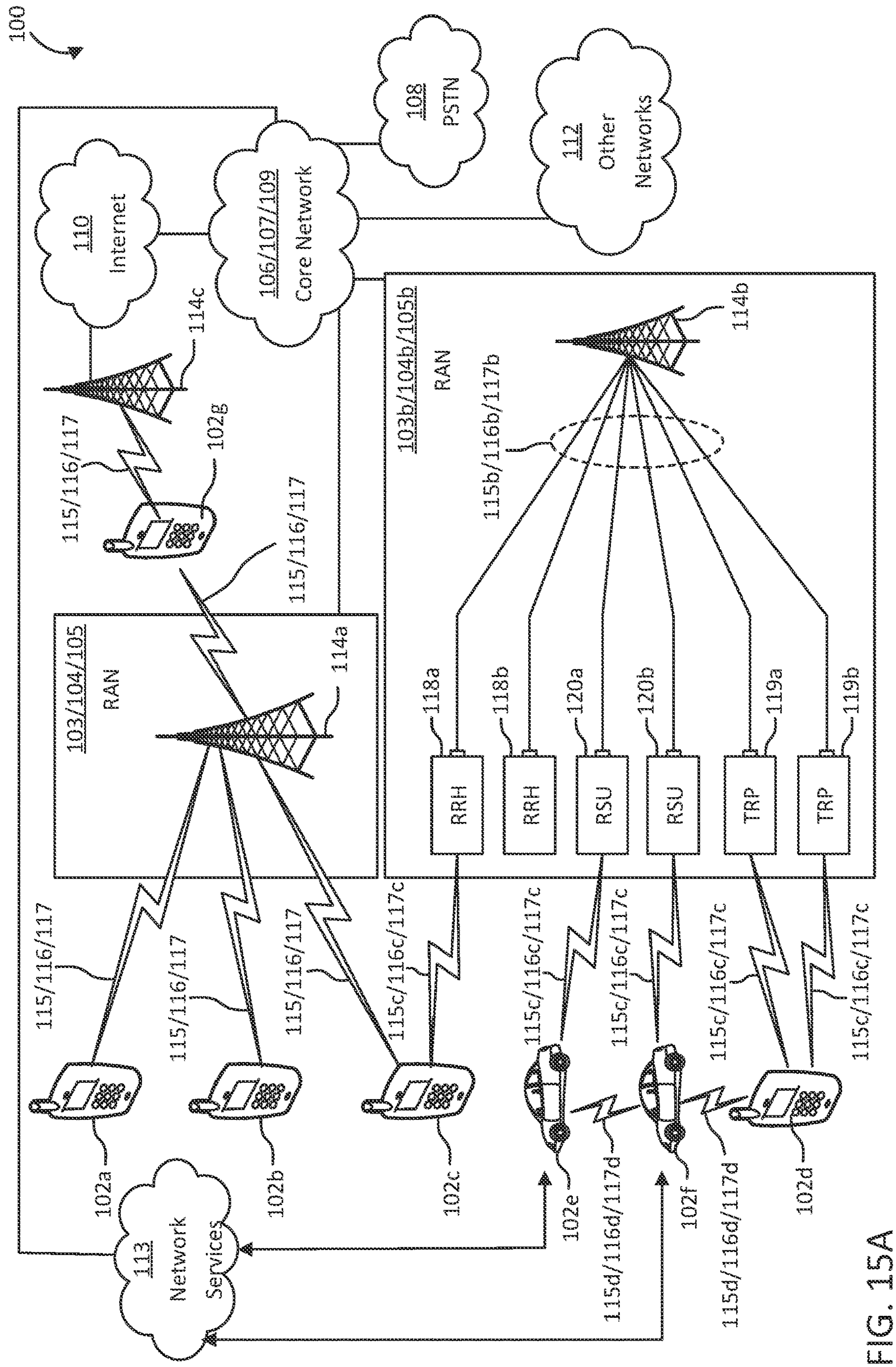
FIG. 15A illustrates an example communications system.

FIG. 15A illustrates an example communications system 100 in which the systems, methods, and apparatuses described and claimed herein may be used. The communications system 100 may include wireless transmit/receive units (WTRUs) 102*a*, 102*b*, 102*c*, 102*d*, 102*e*, 102*f*, and/or 102*g*, which generally or collectively may be referred to as WTRU 102 or WTRUs 102. The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 15A, each of the WTRUs 102 is depicted in FIGS. 15A-E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114*a* and a base station 114*b*. In the example of FIG. 15A, each base stations 114*a* and 114*b* is depicted as a single element. In practice, the base stations 114*a* and 114*b* may include any number of interconnected base stations and/or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, and/or the other networks 112. Similarly, base station 114*b* may be any type of device configured to wiredly and/or wirelessly interface with at least one of the Remote Radio Heads (RRHs) 118*a*, 118*b*, Transmission and Reception Points (TRPs) 119*a*, 119*b*, and/or Roadside Units (RSUs) 120*a* and 120*b* to facilitate access to one or more communication networks, such as the core network 106/107/109, the Internet 110, other networks 112, and/or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, and/or other networks 112.

TRPs 119*a*, 119*b* may be any type of device configured to wirelessly interface with at least one of the WTRU 102*d*, to facilitate access to one or more communication networks, such as the core network 106/107/109, the Internet 110, Network Services 113, and/or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, and/or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations and/or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations and/or network elements (not shown), such as a BSC, a RNC, relay nodes, etc. The base station 114*a* may be configured to transmit and/or receive wireless signals within a particular geographic region, which may be referred to as a cell (not shown). Similarly, the base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, for example, the base station 114*a* may include three transceivers, e.g., one for each sector of the cell. The base station 114*a* may employ Multiple-Input Multiple Output (MIMO) technology and, therefore, may utilize multiple transceivers for each sector of the cell, for instance.

The base station 114*a* may communicate with one or more of the WTRUs 102*a*, 102*b*, 102*c*, and 102*g* over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114*b* may communicate with one or more of the RRHs 118*a* and 118*b*, TRPs 119*a* and 119*b*, and/or RSUs 120*a* and 120*b*, over a wired or air interface 115*b*/116*b*/117*b*, which may be any suitable wired (e.g., cable, optical fiber, etc.) or wireless communication link (e.g., RF, microwave, IR, UV, visible light, cmWave, mmWave, etc.). The air interface 115*b*/116*b*/117*b* may be established using any suitable RAT.

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., RF, microwave, IR, ultraviolet UV, visible light, cmWave, mmWave, etc.) The air interface 115*c*/116*c*/117*c* may be established using any suitable RAT.

The WTRUs 102 may communicate with one another over a direct air interface 115*d*/116*d*/117*d*, such as Sidelink communication which may be any suitable wireless communication link (e.g., RF, microwave, IR, ultraviolet UV, visible light, cmWave, mmWave, etc.) The air interface 115*d*/116*d*/117*d* may be established using any suitable RAT.

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and/or RSUs 120*a* and 120*b* in the RAN 103*b*/104*b*/105*b* and the WTRUs 102*c*, 102*d*, 102*e*, and 102*f*, may implement a radio technology such as Universal Mobile Telecommunications System (UMTS) Terrestrial Radio Access (UTRA), which may establish the air interface 115/116/117 and/or 115*c*/116*c*/117*c* respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114*a* in the RAN 103/104/105 and the WTRUs 102*a*, 102*b*, 102*c*, and 102*g*, or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A), for example. The air interface 115/116/117 or 115*c*/116*c*/117*c* may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114*a* in the RAN 103/104/105 and the WTRUs 102*a*, 102*b*, 102*c*, and 102*g* or RRHs 118*a* and 118*b*, TRPs 119*a* and 119*b*, and/or RSUs 120*a* and 120*b* in the RAN 103*b*/104*b*/105*b* and the WTRUs 102*c*, 102*d*, 102*e*, and 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 15A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114*c* and the WTRUs 102, e.g., WTRU 102*e*, may implement a radio technology such as IEEE 802.11 to establish a Wireless Local Area Network (WLAN). Similarly, the base station 114*c* and the WTRUs 102, e.g., WTRU 102*d*, may implement a radio technology such as IEEE 802.15 to establish a wireless personal area network (WPAN). The base station 114*c* and the WTRUs 102, e.g., WRTU 102*e*, may utilize a cellular-based RAT (e.g., WCDMA, CDMA2000, GSM, LTE, LTE-A, NR, etc.) to establish a picocell or femtocell. As shown in FIG. 15A, the base station 114*c* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 15A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*e*, and 102*f* may include multiple transceivers for communicating with different wireless networks over different wireless links. For example, the WTRU 102*g* shown in FIG. 15A may be configured to communicate with the base station 114*a*, which may employ a cellular-based radio technology, and with the base station 114*c*, which may employ an IEEE 802 radio technology.

Although not shown in FIG. 15A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115*c*/116*c*/117*c* may equally apply to a wired connection.

Figure 15B:
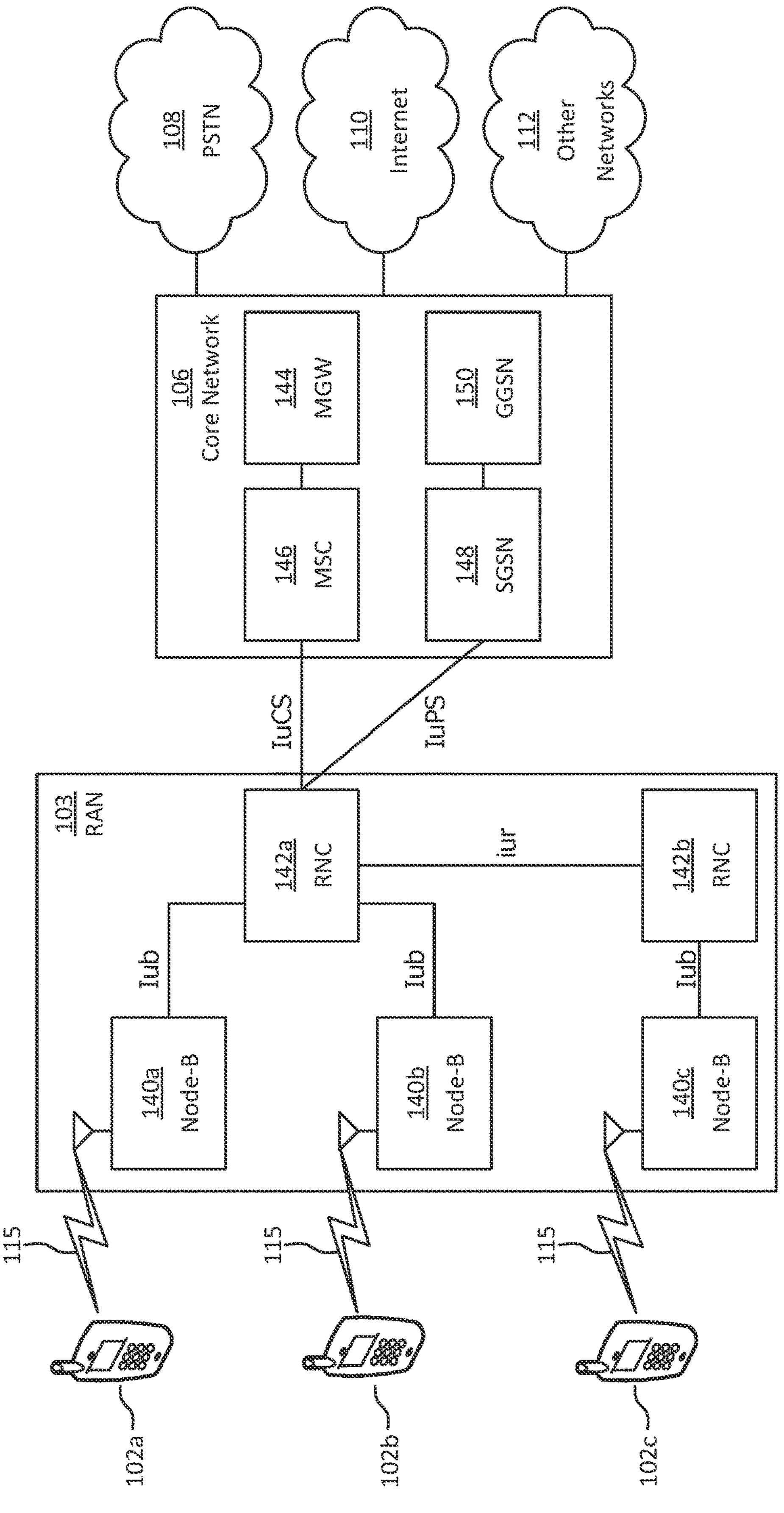
FIGS. 15B-D are system diagrams of example RANs and core networks.

FIG. 15B is a system diagram of an example RAN 103 and core network 106. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 15B, the RAN 103 may include Node-Bs 140*a*, 140*b*, and 140*c*, which may each include one or more transceivers for communicating with the WTRUs 102*a*, 102*b*, and 102*c* over the air interface 115. The Node-Bs 140*a*, 140*b*, and 140*c* may each be associated with a particular cell (not shown) within the RAN 103. The RAN 103 may also include RNCs 142*a*, 142*b*. It will be appreciated that the RAN 103 may include any number of Node-Bs and Radio Network Controllers (RNCs.)

As shown in FIG. 15B, the Node-Bs 140*a*, 140*b* may be in communication with the RNC 142*a*. Additionally, the Node-B 140*c* may be in communication with the RNC 142*b*. The Node-Bs 140*a*, 140*b*, and 140*c* may communicate with the respective RNCs 142*a* and 142*b* via an Iub interface. The RNCs 142*a* and 142*b* may be in communication with one another via an Iur interface. Each of the RNCs 142*a* and 142*b* may be configured to control the respective Node-Bs 140*a*, 140*b*, and 140*c* to which it is connected. In addition, each of the RNCs 142*a* and 142*b* may be configured to carry out or support other functionality, such as outer loop power control, load control, admission control, packet scheduling, handover control, macro-diversity, security functions, data encryption, and the like.

The core network 106 shown in FIG. 15B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, and 102*c* with access to circuit-switched networks, such as the PSTN 108, to facilitate communications between the WTRUs 102*a*, 102*b*, and 102*c*, and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, and 102*c* with access to packet-switched networks, such as the Internet 110, to facilitate communications between and the WTRUs 102*a*, 102*b*, and 102*c*, and IP-enabled devices.

The core network 106 may also be connected to the other networks 112, which may include other wired or wireless networks that are owned and/or operated by other service providers.

Figure 15C:
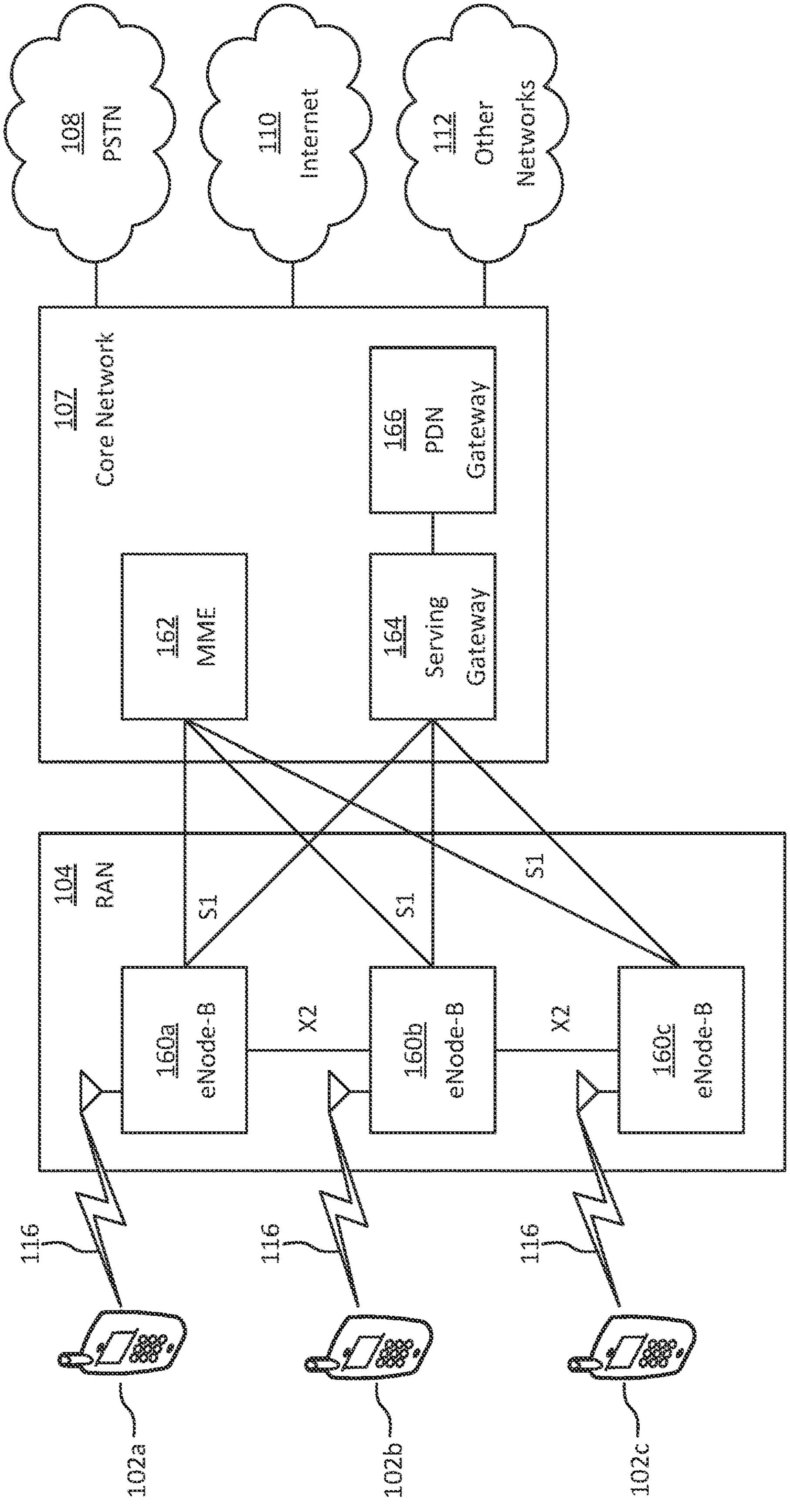

FIG. 15C is a system diagram of an example RAN 104 and core network 107. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, and 160*c*, though it will be appreciated that the RAN 104 may include any number of eNode-Bs. The eNode-Bs 160*a*, 160*b*, and 160*c* may each include one or more transceivers for communicating with the WTRUs 102*a*, 102*b*, and 102*c* over the air interface 116. For example, the eNode-Bs 160*a*, 160*b*, and 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 15C, the eNode-Bs 160*a*, 160*b*, and 160*c* may communicate with one another over an X2 interface.

The core network 107 shown in FIG. 15C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, and 102*c*, bearer activation/deactivation, selecting a particular serving gateway during an initial attach of the WTRUs 102*a*, 102*b*, and 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, and 102*c*. The serving gateway 164 may also perform other functions, such as anchoring user planes during inter-eNode B handovers, triggering paging when downlink data is available for the WTRUs 102*a*, 102*b*, and 102*c*, managing and storing contexts of the WTRUs 102*a*, 102*b*, and 102*c*, and the like.

The serving gateway 164 may also be connected to the PDN gateway 166, which may provide the WTRUs 102*a*, 102*b*, and 102*c* with access to packet-switched networks, such as the Internet 110, to facilitate communications between the WTRUs 102*a*, 102*b*, 102*c*, and IP-enabled devices.

The core network 107 may facilitate communications with other networks. For example, the core network 107 may provide the WTRUs 102*a*, 102*b*, and 102*c* with access to circuit-switched networks, such as the PSTN 108, to facilitate communications between the WTRUs 102*a*, 102*b*, and 102*c* and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102*a*, 102*b*, and 102*c* with access to the networks 112, which may include other wired or wireless networks that are owned and/or operated by other service providers.

Figure 15D:
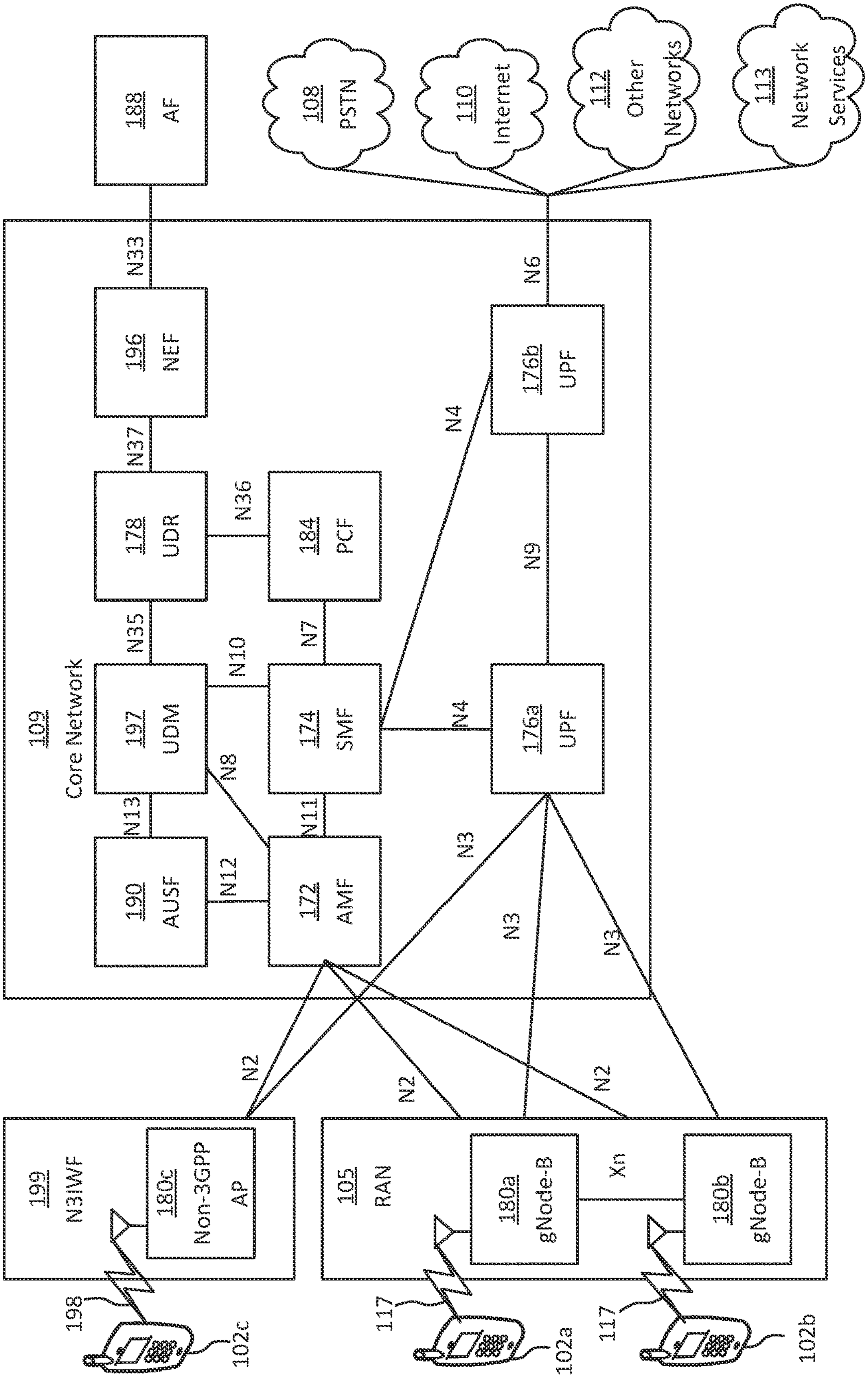

FIG. 15D is a system diagram of an example RAN 105 and core network 109. The RAN 105 may employ an NR radio technology to communicate with the WTRUs 102*a* and 102*b* over the air interface 117. The RAN 105 may also be in communication with the core network 109. A Non-3GPP Interworking Function (N3IWF) 199 may employ a non-3GPP radio technology to communicate with the WTRU 102*c* over the air interface 198. The N3IWF 199 may also be in communication with the core network 109.

The RAN 105 may include gNode-Bs 180*a* and 180*b*. It will be appreciated that the RAN 105 may include any number of gNode-Bs. The gNode-Bs 180*a* and 180*b* may each include one or more transceivers for communicating with the WTRUs 102*a* and 102*b* over the air interface 117. When integrated access and backhaul connection are used, the same air interface may be used between the WTRUs and gNode-Bs, which may be the core network 109 via one or multiple gNBs. The gNode-Bs 180*a* and 180*b* may implement MIMO, MU-MIMO, and/or digital beamforming technology. Thus, the gNode-B 180*a*, for example, may use multiple antennas to transmit wireless signals to, and receive wireless signals from, the WTRU 102*a*. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180*c*. It will be appreciated that the N3IWF 199 may include any number of non-3GPP Access Points. The non-3GPP Access Point 180*c* may include one or more transceivers for communicating with the WTRUs 102*c* over the air interface 198. The non-3GPP Access Point 180*c* may use the 802.11 protocol to communicate with the WTRU 102*c* over the air interface 198.

Each of the gNode-Bs 180*a* and 180*b* may be associated with a particular cell (not shown) and may be configured to handle radio resource management decisions, handover decisions, scheduling of users in the uplink and/or downlink, and the like. As shown in FIG. 15D, the gNode-Bs 180*a* and 180*b* may communicate with one another over an Xn interface, for example.

The core network 109 shown in FIG. 15D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 15G.

In the example of FIG. 15D, the 5G Core Network 109 may include an access and mobility management function (AMF) 172, a Session Management Function (SMF) 174, User Plane Functions (UPFs) 176*a* and 176*b*, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 15D shows that network functions directly connect to one another, however, it should be appreciated that they may communicate via routing agents such as a diameter routing agent or message buses.

In the example of FIG. 15D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102*a*, 102*b*, and 102*c* via an N1 interface. The N1 interface is not shown in FIG. 15D.

The SMF 174 may be connected to the AMF 172 via an N11 interface. Similarly, the SMF may be connected to the PCF 184 via an N7 interface, and to the UPFs 176*a* and 176*b* via an N4 interface. The SMF 174 may serve as a control node. For example, the SMF 174 may be responsible for Session Management, IP address allocation for the WTRUs 102*a*, 102*b*, and 102*c*, management and configuration of traffic steering rules in the UPF 176*a* and UPF 176*b*, and generation of downlink data notifications to the AMF 172.

The UPF 176*a* and UPF 176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example, Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 15D. The PCF 184 may provide policy rules to control plane nodes such as the AMF 172 and SMF 174, allowing the control plane nodes to enforce these rules. The PCF 184 may send policies to the AMF 172 for the WTRUs 102*a*, 102*b*, and 102*c* so that the AMF may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface, and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 15D, in a network slicing scenario, a WTRU 102*a*, 102*b*, or 102*c* may connect to an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, which serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned and/or operated by other service providers.

The core network entities described herein and illustrated in FIG. 15A, FIG. 15C, FIG. 15D, and FIG. 15E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A-E are provided by way of example only, and it is understood that the subject matter disclosed and claimed herein may be embodied or implemented in any similar communication system, whether presently defined or defined in the future.

Figure 15E:
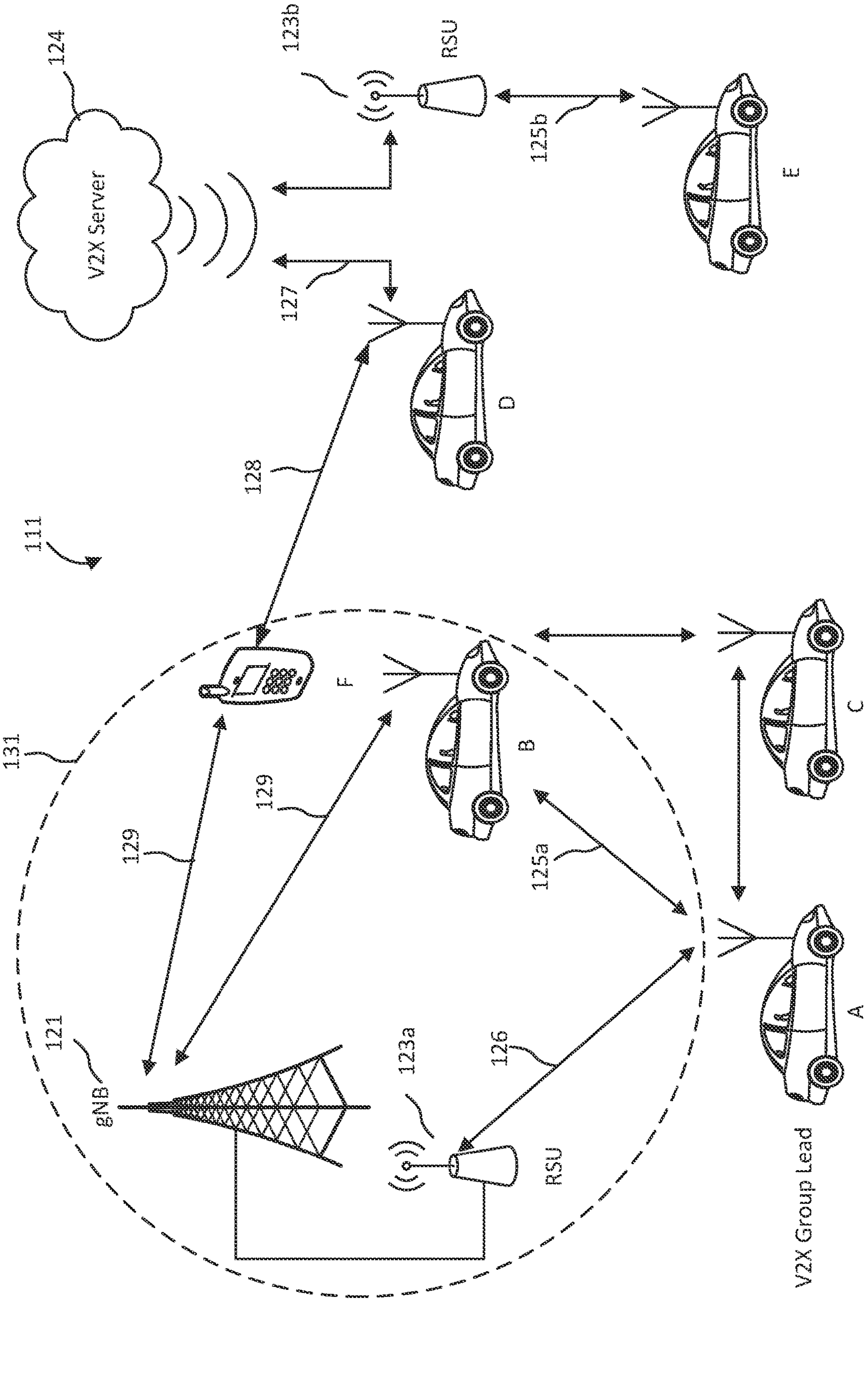
FIG. 15E illustrates another example communications system.

FIG. 15E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Roadside Units (RSUs) 123*a* and 123*b*. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 15E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 15E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V21) interface 127. WTRUs A, B, C, D, E, and F may communicate to another UE via a Vehicle-to-Person (V2P) interface 128.

Figure 15F:
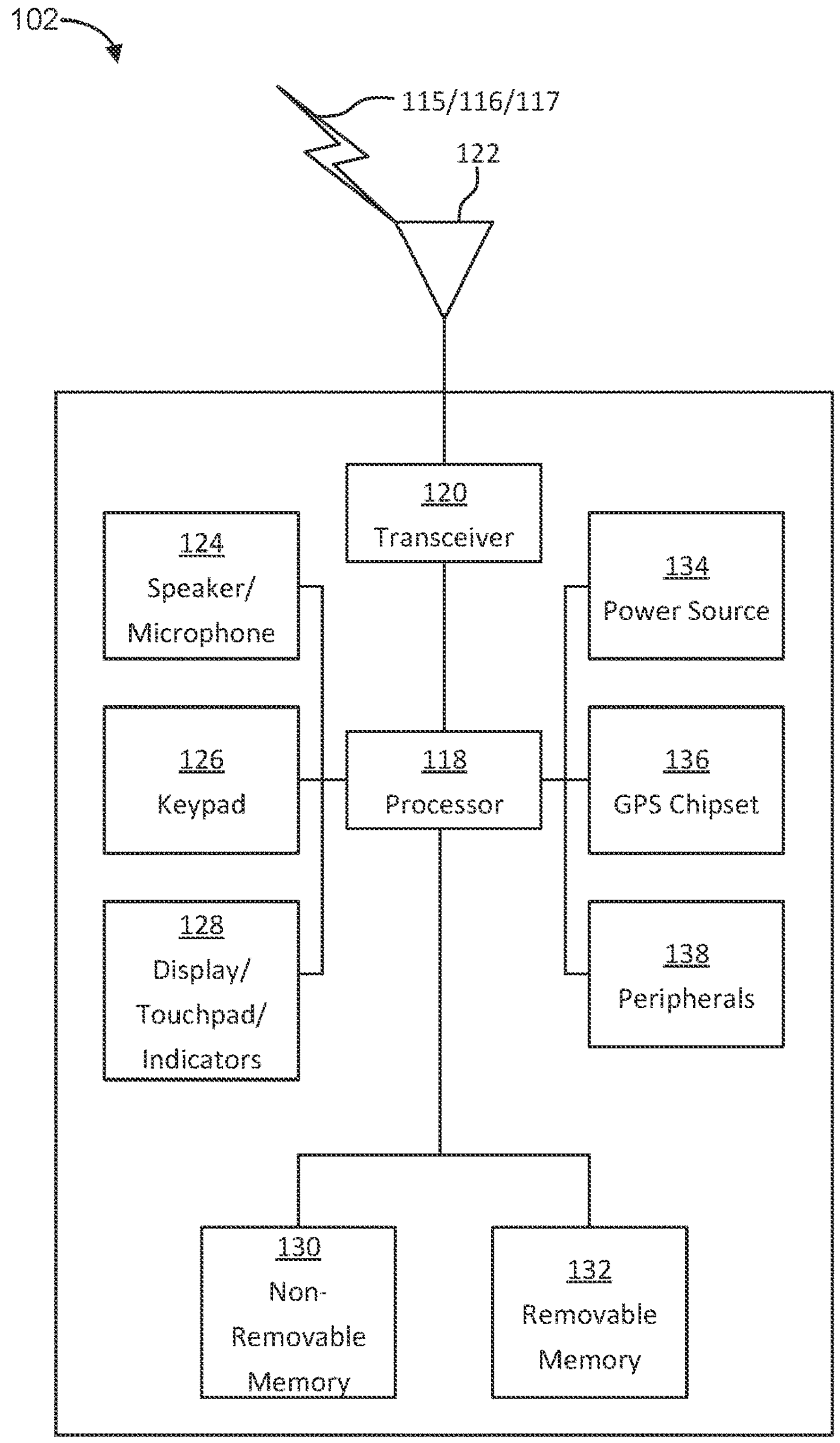
FIG. 15F is a block diagram of an example apparatus or device, such as a WTRU.

FIG. 15F is a block diagram of an example apparatus or device WTRU 102 that may be configured for wireless communications and operations in accordance with the systems, methods, and apparatuses described herein, such as a WTRU 102 of FIG. 15A-EE. As shown in FIG. 15F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 15F and described herein.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 15F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 15A) over the air interface 115/116/117 or another UE over the air interface 115*d*/116*d*/117*d*. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 15F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 15G:
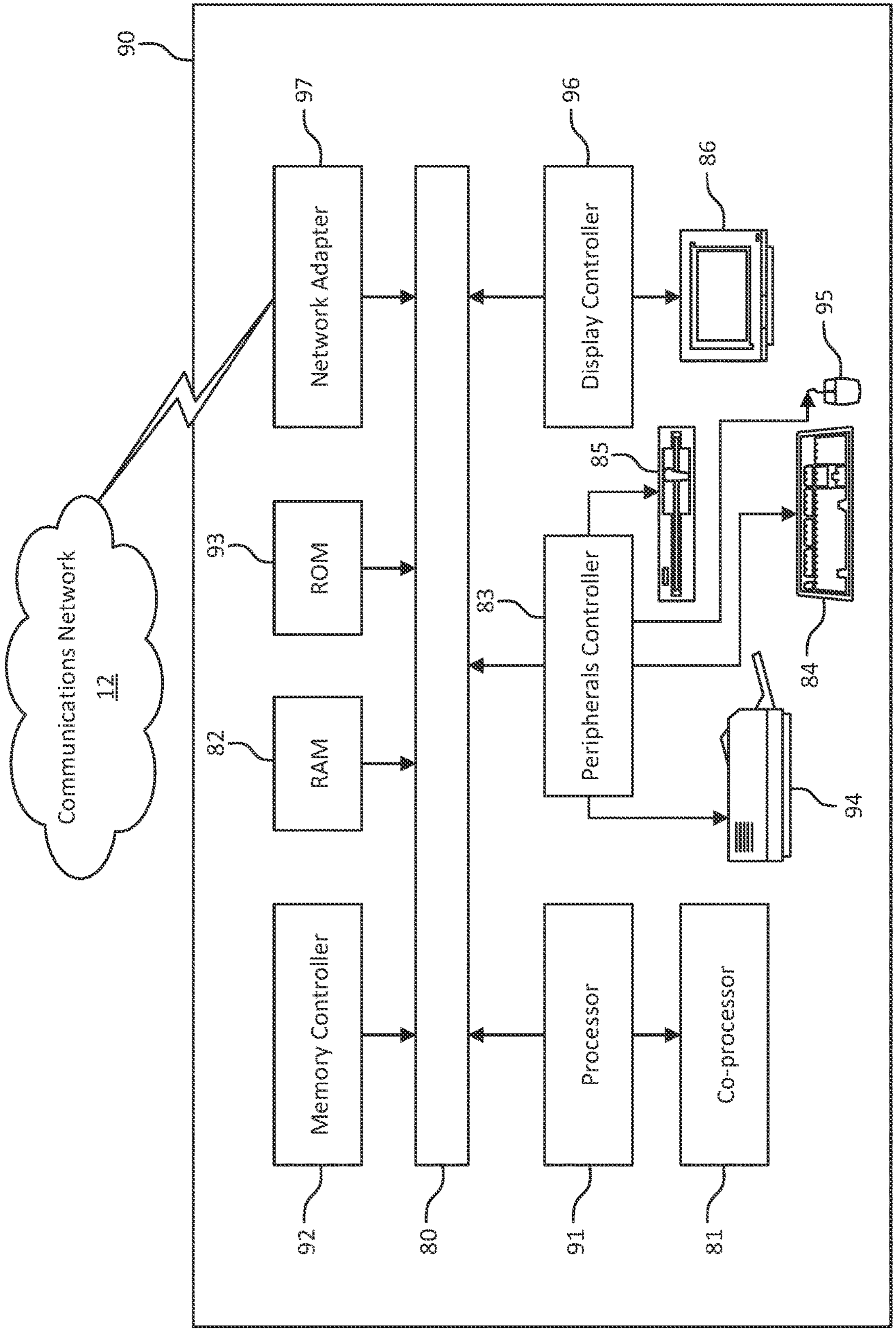
FIG. 15G is a block diagram of an exemplary computing system.

FIG. 15G is a block diagram of an exemplary computing system 90 in which one or more apparatuses of the communications networks illustrated in FIG. 15A, FIG. 15C, FIG. 15D and FIG. 15E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A-1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable, and non-removable media implemented in any non-transitory (e.g., tangible, or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

APPENDIX

TABLE 1

Special fields for single DL SPS or single UL grant Type 2 scheduling activation PDCCH validation when a UE is provided a single SPS PDSCH or UL grant Type 2 configuration in the active DL/UL bandwidth part (BWP) of the scheduled cell

| | DCI format 0_0/0_1/0_2 | DCI format 1_0/1_2 | DCI format 1_1 |
|---|---|---|---|
| HARQ process number | set to all '0's | set to all '0's | set to all '0's |
| Redundancy version | set to all '0's | set to all '0's | For the enabled transport block: set to all '0's |

TABLE 2

| Special fields for single DL SPS or single UL grant Type 2 scheduling release PDCCH validation when a UE is provided a single SPS PDSCH or UL grant Type 2 configuration in the active DL/UL BWP of the scheduled cell | | |
|---|---|---|
| | DCI format 0_0/0_1/0_2 | DCI format 1_0/1_1/1_2 |
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 2 with μ = 1 set to all '1's, otherwise | set to all '0's for FDRA Type 0 or for dynamicSwitch set to all '1's for FDRA Type 1 |

TABLE 3

| Special fields for a single DL SPS or single UL grant Type 2 scheduling activation PDCCH validation when a UE is provided multiple DL SPS or UL grant Type 2 configurations in the active DL/UL BWP of the scheduled cell | | | |
|---|---|---|---|
| | DCI format 0_0/0_1/0_2 | DCI format 1_0/1_2 | DCI format 1_1 |
| Redundancy version | set to all '0's | set to all '0's | For the enabled transport block: set to all '0's |

TABLE 4

| Special fields for a single or multiple DL SPS and UL grant Type 2 scheduling release PDCCH validation when a UE is provided multiple DL SPS or UL grant Type 2 configurations in the active DL/UL BWP of the scheduled cell | | |
|---|---|---|
| | DCI format 0_0/0_1/0_2 | DCI format 1_0/1_1/1_2 |
| Redundancy version | set to all '0's | set to all '0's |
| Modulation and coding scheme | set to all '1's | set to all '1's |
| Frequency domain resource assignment | set to all '0's for FDRA Type 2 with μ = 1 set to all '1's, otherwise | set to all '0's for FDRA Type 0 or for dynamicSwitch set to all '1's for FDRA Type 1 |

TABLE 5

| Additional parameters for SPS-Config-RedCap IE |
|---|
| timeDomainOffset: Offset between SFN/slot indicated by timeDomainReference, or particular SFN/slot such as the one that carries the activation PDCCH, and the first SFN or slot that carries the first occasion of DL-SPS Type2. If not configured the offset may be zero. |
| Alternatively, UE may apply K0 indicated in a row index m + 1 of the used time domain resource allocation table indicated value m through the timeDomainAllocation. If timeDomainOffset is configured, UE may ignore the indicated K0 through timeDomainAllocation. |
| timeDomainReference: Reference SFN or slot |
| timeDomainAllocation: Indicates a combination of start symbol and length and PDSCH mapping type based on the used time domain resource allocation table. If timeDomainOffset is configured, UE may ignore K0. |
| Alternatively, the SFN or slot offset between the one carrying PDCCH and the first monitoring occasion of PDSCH is provided according to a function of K0 of the indicated m + 1 row index of the used time domain resource allocation table and value indicated by timeDomainOffset. For example, the offset may be provided by timeDomainOffset + K0. |
| frequencyDomainAllocation: Indicates the frequency domain resource allocation according to TS 38.214 , clause 5.1.2, i.e., either through downlink allocation type 0 or 1. "N" LSB bits of the parameter may be used to indicate the frequency domain resources. The value of "N" may be equal the size of frequency domain resources assignment field in last UE-specific DCI format 1_0, 1_1, or 1_2 before the reception of DCI that activates DL-SPS Type 2. |
| Alternatively, the value of "N" is determined based the frequency domain resource allocation type indicated by resourceAllocation. For example, if resourceAllocation is set to frequency domain resource allocation type 0, then "N" is equal to the number of resource block group "$N_{RBG}$" defined in TS 38.214, or the number of PRB of DL BWP carrying DL-SPS Type 2. If resourceAllocation is set to frequency domain resource allocation type 1, then "N" may derived using some formula such as $\lceil \log_2(N_{RB}^{DL,\ BWP}(N_{RB}^{DL,\ BWP} + 1)/2) \rceil$, where $N_{RB}^{DL,\ BWP}$ is the size of active DL BWP. |
| Alternatively, the UE shall assume one that one of the resource allocation modes is the default mode. For example, downlink allocation type 1 may be the default downlink allocation type, unless otherwise is configured, and "N" may be derived as described above. |
| Alternatively, if resourceAllocation is not configured, some bits of frequencyDomainAllocation may be used to indicate which type of frequency domain resource allocation is used and then UE can figure out the value of "N" as described above. For example, the MSB of frequencyDomainAllocation may be used to indicate which type of resource allocation is used. For example, if the MSB is set to "0", gNB uses frequency domain resource allocation type 0 and "N" is derived according to this assumption. If the MSB is set to "1", gNB uses frequency domain resource allocation type 1 and "N" is derived according to this assumption. |
| resourceAllocation: Configuration of resource allocation type 0 and resource allocation type 1 for DL-SPS Type 2. For Type 1 UL data transmission without grant, resourceAllocation should be resourceAllocationType0 or resourceAllocationType1. |
| mcsAndTBS: The modulation order, target code rate and TB size by providing $I_{MCS}$. Reduced capability NR devices may not need to support all MCS indices supported by legacy UEs. Therefore, restricted set of MCS indices may be applied. |
| frequencyHoppingOffset: For the case that frequency hopping is supported for DL-SPS Type 2, e.g., intra-slot, inter-slot, across BWPs/carrier aggregation (CA) frequency hopping, etc., frequencyHoppingOffset may be configured, depending on the frequency hopping type, and it provides the frequency offset that should be applied. |
| frequencyHoppingType: Indicates the type of the applied frequency hopping procedure for DL-SPS Type 2. |

TABLE 6

Exemplary of DL/UL configured grant deactivation and/or activation DCI for a single DL-SPS Type 2 or UL CG Type 3

| Field Name | # bits |
|---|---|
| DL/UL Indicator | 1 |
| Activation Indicator | 1 |
| Deactivation Indicator | 1 |

TABLE 7

Exemplary of DL/UL configured grant deactivation and/or activation DCI for a single DL-SPS Type 2 or UL CG Type 3 with time offset indicator field

| Field Name | # bits |
|---|---|
| DL/UL Indicator | 1 |
| Activation Indicator | 1 |
| Deactivation Indicator | 1 |
| Time Offset Indicator | 4 |

TABLE 8

Exemplary of DL/UL configured grant deactivation and/or activation DCI when UEs are provided with multiple DL-SPS Type 2 or UL CG Type 3 grants

| Field Name | # bits |
|---|---|
| DL/UL Indicator | 1 |
| Activation Indicator | 1 |
| Deactivation Indicator | 1 |
| Grant Index (common) | 4 |

TABLE 9

Exemplary of DL/UL configured grant deactivation and/or activation DCI when UEs are provided with multiple DL-SPS Type 2 or UL CG Type 3 grants with multiple Grant Index fields

| Field Name | # bits |
|---|---|
| DL/UL Indicator (common) | 1 |
| Activation Indicator (common) | 1 |
| Deactivation Indicator (common) | 1 |
| Grant Index_0 | 4 |
| Grant Index_1 | 4 |
| . | . |
| . | . |
| . | . |
| Grant Index_N | 4 |

TABLE 10

Exemplary of DL/UL configured grant deactivation and/or activation DCI when UEs are provided with multiple DL-SPS Type 2 or UL CG Type 3 grants with multiple Grant Index and (De)Activation Indicator fields

| Field Name | # bits |
|---|---|
| DL/UL Indicator (common) | 1 |
| Activation Indicator_0 | 1 |
| Deactivation Indicator_0 | 1 |
| Grant Index_0 | 4 |
| Activation Indicator_1 | 1 |
| Deactivation Indicator_1 | 1 |
| Grant Index_1 | 4 |
| . | . |
| . | . |
| . | . |
| Activation Indicator_N | 1 |
| Deactivation Indicator_N | 1 |
| Grant Index_N | 4 |

TABLE 11

Exemplary of DL/UL configured grant deactivation and/or activation DCI when UEs are provided with multiple consecutive DL-SPS Type 2 or UL CG Type 3 grants with multiple Grant Index and (De)Activation Indicator fields

| Field Name | # bits |
|---|---|
| DL/UL Indicator (common) | 1 |
| Activation Indicator_0 | 1 |
| Deactivation Indicator_0 | 1 |
| Activation Indicator_1 | 1 |
| Deactivation Indicator_1 | 1 |
| . | . |
| . | . |
| . | . |
| Activation Indicator_N | 1 |
| Deactivation Indicator_N | 1 |
| Grant Index_0 | 4 |
| Grant Index_1 | 4 |
| . | . |
| . | . |
| . | . |
| Grant Index_N | 4 |

TABLE 12

Applicable DL/UL TDRA table when the grant or the activation command is provided through GC-PDCCH

| pXsch-TimeDomainAllocationList-GroupScheduling-r17 is provided | TDRA table to apply |
|---|---|
| Yes | UE applies pXsch-TimeDomainAllocationList-GroupScheduling-r17 |
| No | UE applies pXsch-TimeDomainAllocationList provided in PXSCH-ConfigCommon or PXSCH-Config |

TABLE 13

Exemplary of DL/UL configured grant deactivation and/or activation DCI when UEs are provided with multiple consecutive DL-SPS or UL CG Type 2 grants

| Field Name | # bits |
|---|---|
| DL/UL Indicator | 1 |
| Activation Indicator | 1 |
| Deactivation Indicator | 1 |
| Modulation and coding scheme | 5 |

TABLE 13-continued

Exemplary of DL/UL configured grant deactivation and/or activation DCI when UEs are provided with multiple consecutive DL-SPS or UL CG Type 2 grants

| Field Name | # bits |
|---|---|
| Grant Index_0 | 4 |
| TDRA_0 | 4 |
| FDRA_0 | $\lceil \log_2(N_{RB}^{DL/UL\ BWP}(N_{RB}^{DL/UL\ BWP}+1)/2) \rceil$ for resource allocation type 1 where $N_{RB}^{DL/UL\ BWP}$ is the number RB with DL/UL BWP |
| Grant Index_1 | 4 |
| TDRA_1 | 4 |
| FDRA_1 | $\lceil \log_2(N_{RB}^{DL/UL\ BWP}(N_{RB}^{DL/UL\ BWP}+1)/2) \rceil$ for resource allocation type 1 where $N_{RB}^{DL/UL\ BWP}$ is the number RB with DL/UL BWP |
| . | . |
| . | . |
| . | . |
| Grant Index_N | 4 |
| TDRA_N | 4 |
| FDRA_N | $\lceil \log_2(N_{RB}^{DL/UL\ BWP}(N_{RB}^{DL/UL\ BWP}+1)/2) \rceil$ for resource allocation type 1 where $N_{RB}^{DL/UL\ BWP}$ is the number RB with DL/UL BWP |

TABLE 14

Exemplary of the purpose field in GC-PDCCH

| Purpose field | Purpose of GC-PDCCH |
|---|---|
| 00 | For providing dynamic grant to a group of UEs |
| 01 | For providing the deactivation and/or activation command of configured DL/UL grant |
| 10 | For requesting aperiodic CSI reports |

TABLE 15

Acronyms

| | |
|---|---|
| ARQ | Automatic Repeat Request |
| BWP | Bandwidth Part |
| CA | Carrier aggregation |
| CCE | Control Channel Element |
| CG | Configured Grant |
| CORESET | Control resource set |
| CRC | Cyclic Redundancy Check |
| C-RNTI | Cell Radio-Network Temporary Identifier |
| CSI | Channel State Information |
| DCI | DL Control Information |
| DL | Downlink |
| DMRS | Demodulation Reference Signal |
| FDRA | Frequency Domain Resource Assignment |
| GC-PDCCH | Group Common-PDCCH |
| HARQ | Hybrid ARQ |
| IE | Information Element |
| MAC | Medium Access Control |
| MAC-CE | Medium Access Control-Control Element |
| NR | New Radio |
| OFDM | Orthogonal Frequency Division Multiplexing |
| PDCCH | Physical Downlink Control Channel |
| PDSCH | Physical Downlink Shared Channel |
| PHY | Physical Layer |
| PUCCH | Physical uplink control channel |
| PUSCH | Physical uplink shared channel |
| RAN | Radio Access Network |
| RE | Resource Element |
| RRC | Radio Resource Control |
| SPS | Semi-Persistent Scheduling |
| TDRA | Time Domain Resource Assignment |
| UCI | Uplink Control Information |
| UE | User Equipment |
| UL | Uplink |

CODE EXAMPLE 1 - Exemplary of SPS-Config-RedCap IE used for signaling the parameters of DL-SPS Type 2

```
-- ASN1START
-- TAG-SPS-CONFIG-START
SPS-Config ::=              SEQUENCE {
  periodicity               ENUMERATED {ms10, ms20, ms32, ms40, ms64, ms80,
      ms128, ms160, ms320, ms640,
    spare6, spare5, spare4, spare3, spare2, spare1},
  nrofHARQ-Processes               INTEGER (1..8),
  n1PUCCH-AN                      PUCCH-ResourceId
                            OPTIONAL,      -- Need M
  mcs-Table                   ENUMERATED {qam64LowSE}
                            OPTIONAL,      -- Need S
  ...,
  [[
  sps-ConfigIndex-r16           SPS-ConfigIndex-r16
                          OPTIONAL,    -- Need N
  harq-ProcID-Offset-r16           INTEGER (0..15)
                          OPTIONAL,    -- Need N
  periodicityExt-r16           INTEGER (1..5120)
                          OPTIONAL,    -- Need N
  harq-CodebookID-r16              INTEGER (1..2)
                          OPTIONAL     -- Need N
  ]]
      timeDomainOffset                    INTEGER (0..5119),
      timeDomainReference                   ENUMERATED {sfn512}                OPTIONAL    -- Need R
    timeDomainAllocation                  INTEGER (0..15),
    frequencyDomainAllocation                 BIT STRING (SIZE(18)),
      resourceAllocation                ENUMERATED { resourceAllocationType0, resourceAllocationType1},
    mcsAndTBS                   INTEGER (0..31),
    frequencyHoppingOffset                INTEGER (1.. maxNrofPhysicalResourceBlocks-1)    OPTIONAL,    -- Need R
    frequencyHoppingType                  ENUMERATED {intraSlot, interSlot, acrossBWP, acrossBWP}
}
-- TAG-SPS-CONFIG-STOP
-- ASN1STOP
```

Code Example 2 - Exemplary ConfiguredGrantConfig IE used for signaling GrantType

```
-- ASN1START
-- TAG-CONFIGUREDGRANTCONFIG-START
ConfiguredGrantConfig ::=               SEQUENCE {
  frequency Hopping                     ENUMERATED {intraSlot, interSlot}
                                   OPTIONAL,             -- Need S
  cg-DMRS-Configuration                    DMRS-UplinkConfig,
  mcs-Table                           ENUMERATED {qam256, qam64LowSE}
                                   OPTIONAL,             -- Need S
  mcs-TableTransformPrecoder                ENUMERATED {qam256, qam64LowSE}
                                   OPTIONAL,             -- Need S
  uci-OnPUSCH                           SetupRelease { CG-UCI-OnPUSCH }
                                   OPTIONAL,             -- Need M
  resourceAllocation                    ENUMERATED { resourceAllocationType0,
        resourceAllocationType1, dynamicSwitch },
  rbg-Size                         ENUMERATED {config2}
                                   OPTIONAL,             -- Need S
  powerControlLoopToUse                     ENUMERATED {n0, n1},
  p0-PUSCH-Alpha                         P0-PUSCH-AlphaSetId,
  transformPrecoder                     ENUMERATED {enabled, disabled}
                                   OPTIONAL,             -- Need S
  nrofHARQ-Processes                      INTEGER(1..16),
  repK                            ENUMERATED {n1, n2, n4, n8},
  repK-RV                            ENUMERATED {s1-0231, s2-0303, s3-0000}
                                   OPTIONAL,             -- Need R
  periodicity                        ENUMERATED {
      sym2, sym7, sym1x14, sym2x14, sym4x14, sym5x14, sym8x14, sym10x14, sym16x14,
      sym20x14, sym32x14, sym40x14, sym64x14, sym80x14, sym128x14, sym160x14,
      sym256x14, sym320x14, sym512x14,
      sym640x14, sym1024x14, sym1280x14, sym2560x14, sym5120x14,
       sym6, sym1x12, sym2x12, sym4x12, sym5x12, sym8x12,
       sym10x12, sym16x12, sym20x12, sym32x12,
       sym40x12, sym64x12, sym80x12, sym128x12, sym160x12, sym256x12, sym320x12,
       sym512x12, sym640x12, sym1280x12, sym2560x12
  },
  configuredGrantTimer                      INTEGER (1..64)
                                      OPTIONAL,                -- Need R
  rrc-ConfiguredUplinkGrant                SEQUENCE {
      GrantType                                                  ENUMERATED { ULCGType1, ULCGType3},
    timeDomainOffset                         INTEGER (0..5119),
    timeDomainAllocation                     INTEGER (0..15),
    frequencyDomainAllocation                            BIT STRING (SIZE(18)),
    antennaPort                          INTEGER (0..31),
    dmrs-SeqInitialization                   INTEGER (0..1)
                                        OPTIONAL,                  -- Need R
    precodingAndNumberOfLayers                               INTEGER (0..63),
    srs-ResourceIndicator                    INTEGER (0..15)
                                        OPTIONAL,                  -- Need R
    mcsAndTBS                              INTEGER (0..31),
    frequency HoppingOffset                  INTEGER (1.. maxNrofPhysicalResourceBlocks-1)  OPTIONAL,  -- Need R
    pathlossReferenceIndex                   INTEGER (0..maxNrofPUSCH-PathlossReferenceRSs-1),
                                                           <Irrelevant text is omitted>
  }                                                          OPTIONAL,   -- Need R
                                                            <Irrelevant text is omitted>
  ]]
}
                                                           <Irrelevant text is omitted>
-- TAG-CONFIGUREDGRANTCONFIG-STOP
-- ASN1STOP
```

We claim:

1. A user equipment (UE) comprising:

a processor, communications circuitry, and memory storing instructions which, when executed by the processor, cause the UE to:

receive, from a first base station (first gNB) a first communications configuration via radio resource control (RRC) signalling;

receive, from a second gNB, a group common Physical Downlink Control Channel (GC-PDCCH) for a plurality of UEs that includes the UE, wherein the GC-PDCCH comprises a time domain resource assignment (TDRA) field containing TDRA information and a frequency domain resource alignment (FDRA) field containing FDRA information, wherein the TDRA and FDRA fields are scrambled with a particular radio-network temporary identifier (RNTI) configured by a higher layer parameter;

based on a PDSCH-TimeDomainAllocationList being provided, apply the PDSCH-TimeDomainAllocationList for the TDRA; and communicate with the second gNB using the first communication configuration, the TDRA information and the FDRA information.

2. The UE of claim 1, wherein the GC-PDCCH further includes a field for indicating Channel State Information (CSI) for the plurality of UEs.

3. The UB of claim 1, wherein the particular RNTI differs from each of:

an RNTI for providing dynamic grant,
an activation/deactivation command for a configured grant, and
a cell RNTI (C-RNTD) for providing a UE-specific CSI report.

4. The UE of claim 1, wherein the TDRA field is shared with other UEs of the plurality of UEs.

5. The UE of claim 1, wherein the FDRA field is shared with other UEs of the plurality of UEs.

6. The UE of claim 1, wherein the first communications configuration comprises at least one of:
a first Semi-Persistent Scheduling (SPS) downlink (DL) configuration indicating one or more DL resources that are available to the UE for DL communication with the second gNB, or
a first uplink (UL) Configured Grant (CG) configuration indicating one or more UL resources that are available to the UE for UL communication with the second gNB.

7. The UE of claim 6, wherein the instructions further cause the UE to:
receive, from the first gNB, a second communications configuration comprising at least one of a second SPS DL configuration or a second UL CG configuration; and
receive, from the second gNB via downlink control information (DCD) within the GC-PDCCH, a group common activation that indicates whether to activate the first communications configuration or the second communications configuration, and
activate the first communications configuration or the second communications configuration based on the group common activation.

8. A method performed by a user equipment (UE) comprising:
receiving, from a first base station (first gNB) a first communications configuration via radio resource control (RRC) signalling;
receiving, from a second gNB, a group common Physical Downlink Control Channel (GC-PDCCH) for a plurality of UEs that includes the UE,
wherein the GC-PDCCH comprises a time domain resource assignment (TDRA) field containing TDRA information and a frequency domain resource alignment (FDRA) field containing FDRA information,
wherein the TDRA and FDRA fields are scrambled with a particular radio-network temporary identifier (RNTI) configured by a higher layer parameter;
based on a PDSCH-TimeDomainAllocationList being provided, applying the PDSCH-TimeDomainAllocationList for the TDRA; and
communicating with the second gNB using the first communication configuration, the TDRA information and the FDRA information.

9. The method of claim 8, wherein the GC-PDCCH further includes a field for indicating Channel State Information (CSD) for the plurality of UEs.

10. The method of claim 8, wherein the particular RNTI differs from each of:
an RNTI for providing dynamic grant,
an activation/deactivation command for a configured grant, and
a cell RNTI (C-RNTI) for providing a UE-specific CSI report.

11. The method of claim 8, wherein the TDRA field is shared with other UEs of the plurality of UEs.

12. The method of claim 8, wherein the FDRA field is shared with other UEs of the plurality of UEs.

13. The method of claim 8, wherein the FDRA field is shared with other UEs of the plurality of UEs.

14. The method of claim 8, wherein the first communications configuration comprises at least one of:
a first Semi-Persistent Scheduling (SPS) downlink (DL) configuration indicating one or more DL resources that are available to the UE for DL communication with the second gNB, or
a first uplink (UL) Configured Grant (CG) configuration indicating one or more UL resources that are available to the UE for UL communication with the second gNB.

15. The method of claim 14, further comprising:
receiving, from the first gNB, a second communications configuration comprising at least one of a second SPS DL configuration or a second UL CG configuration; and
receiving, from the second gNB via downlink control information (DCI) within the GC-PDCCH, a group common activation that indicates whether to activate the first communications configuration or the second communications configuration, and
activating the first communications configuration or the second communications configuration based on the group common activation.

16. A non-transitory computer product containing instructions for a method performed by a user equipment (UE), the method comprising:
receiving, from a first base station (first gNB) a first communications configuration via radio resource control (RRC) signalling;
receiving, from a second gNB, a group common Physical Downlink Control Channel (GC-PDCCH) for a plurality of UEs that includes the UE,
wherein the GC-PDCCH comprises a time domain resource assignment (TDRA) field containing TDRA information and a frequency domain resource alignment (FDRA) field containing FDRA information,
wherein the TDRA and FDRA fields are scrambled with a particular radio-network temporary identifier (RNTI) configured by a higher layer parameter;
based on a PDSCH-TimeDomainAllocationList being provided, applying the PDSCH-TimeDomainAllocationList for the TDRA; and
communicating with the second gNB using the first communication configuration, the TDRA information and the FDRA information.

* * * * *